United States Patent
Piazza et al.

(10) Patent No.: US 8,667,574 B2
(45) Date of Patent: Mar. 4, 2014

(54) ASSIGNING A NETWORK ADDRESS FOR A VIRTUAL DEVICE TO VIRTUALLY EXTEND THE FUNCTIONALITY OF A NETWORK DEVICE

(75) Inventors: Kevin Piazza, Santa Ana, CA (US); Don Matsubayashi, Tustin, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 12/777,213

(22) Filed: May 10, 2010

(65) Prior Publication Data

US 2011/0277028 A1    Nov. 10, 2011

(51) Int. Cl.
*H04L 29/06* (2006.01)

(52) U.S. Cl.
USPC ............................................ 726/11; 726/27

(58) Field of Classification Search
USPC .............................. 726/11, 27; 709/222; 718/1
See application file for complete search history.

(56) References Cited

U.S. PATENT DOCUMENTS

| | | | |
|---|---|---|---|
| 6,349,336 B1 | 2/2002 | Sit et al. | |
| 6,633,984 B2 | 10/2003 | Susser et al. | |
| 6,721,804 B1 | 4/2004 | Rubin et al. | |
| 6,854,121 B2 | 2/2005 | Barnard et al. | |
| 6,898,711 B1 | 5/2005 | Bauman et al. | |
| 7,082,608 B1 * | 7/2006 | Wilson et al. | 719/315 |
| 7,086,608 B2 | 8/2006 | Perkins | |
| 7,093,122 B1 | 8/2006 | Susser et al. | |
| 7,290,042 B2 | 10/2007 | Kinoshita et al. | |
| 7,316,028 B2 | 1/2008 | Donatelli et al. | |
| 7,454,622 B2 | 11/2008 | Laidlaw et al. | |
| 7,478,245 B2 | 1/2009 | Allen | |
| 7,552,239 B2 | 6/2009 | Jean et al. | |
| 7,607,140 B2 | 10/2009 | Kato et al. | |
| 7,966,015 B2 * | 6/2011 | Omar et al. | 455/435.1 |
| 2003/0126441 A1 | 7/2003 | Laux et al. | |
| 2008/0005432 A1 | 1/2008 | Kagawa | |
| 2008/0168158 A1 | 7/2008 | Bantz et al. | |
| 2008/0201486 A1 * | 8/2008 | Hsu et al. | 709/238 |
| 2008/0310392 A1 | 12/2008 | Dowling et al. | |
| 2009/0222517 A1 * | 9/2009 | Kalofonos et al. | 709/204 |
| 2009/0235174 A1 | 9/2009 | Royt | |
| 2010/0095023 A1 * | 4/2010 | Frank et al. | 709/245 |
| 2010/0287548 A1 * | 11/2010 | Zhou et al. | 718/1 |
| 2011/0246630 A1 * | 10/2011 | Deutsch et al. | 709/222 |
| 2012/0015644 A1 * | 1/2012 | Danford et al. | 455/419 |

OTHER PUBLICATIONS http://www.wyse.com/products/software/tcx/Wyse_TCX_USB_Virtualizer.pdf, Wyse TCX USB Virtualizer 1.0 over VDI, 2008.

(Continued)

*Primary Examiner* — Jeffrey Pwu
*Assistant Examiner* — Thong Truong
(74) *Attorney, Agent, or Firm* — Fitzpatrick, Cella, Harper & Scinto

(57) ABSTRACT

Virtually extending the functionality of a network device to a server is provided. A virtual device which virtually represents functionality of the network device is created. An association is stored between the network device and a user or a group for the network device. A determination is made as to whether the network device and the user or the group for the network device correspond to a local network or to a disparate network, based on the stored association. A network address for the virtual device is assigned based on the determination. Functionality of the network device is accessed via the virtual device, using the assigned network address for the virtual device.

26 Claims, 19 Drawing Sheets

(56) References Cited

OTHER PUBLICATIONS http://www.sharpusa.com/products/FunctionPressReleaseSingle/0,1080,767-5,00.html, "Sharp OSA Platform Reaches New Frontiers With Enhanced Support and Capabilities", May 7, 2008.

http://www.silex.jp/japan/doc/pr080423_SX_Virtual_USB_SDK_vol93.pdf, "Silex Technology Announces SDK Enabling USB Device Networking", Nov. 25, 2008.

Snader, Jon C., "VPNs Illustrated: Tunnels, VPNs, and IPsec", Addison-Wesley Professional, pp. 1 to 461, 2006.

Venkateswaran, Sreekrishnan, "Essential Linux Device Drivers", Prentice Hall, pp. 1 to 714, 2007.

U.S. Appl. No. 12/331,287, filed Dec. 9, 2008. Applicant: Royce Slick.

"SSH_VPN", https://help.ubuntu.com/community/SSH_VPN, pp. 1-9, May 31, 2009.

http://usbip.sourceforge.net/, "USB/IP Project", pp. 1-6, Updated Jul. 10, 2009.

D. Melanson, "IOGEAR rolls out USB-sharing Net ShareStation", http://feeds.engadget.com/~r/weblogsinc/engadget/~3/293827534/, pp. 1-6, May 19, 2008.

http://www.openvpn.net/index.php/open-source/documentation/howto.html, "HOWTO", pp. 1-37, print date: Apr. 29, 2010.

"Wyse Technology", http://www.wyse.co.jp, print date: Apr. 29, 2010.

"Remote Attendant Console Across a Firewall", Cisco Document ID: 71668, pp. 1-4, Mar. 5, 2008.

\* cited by examiner

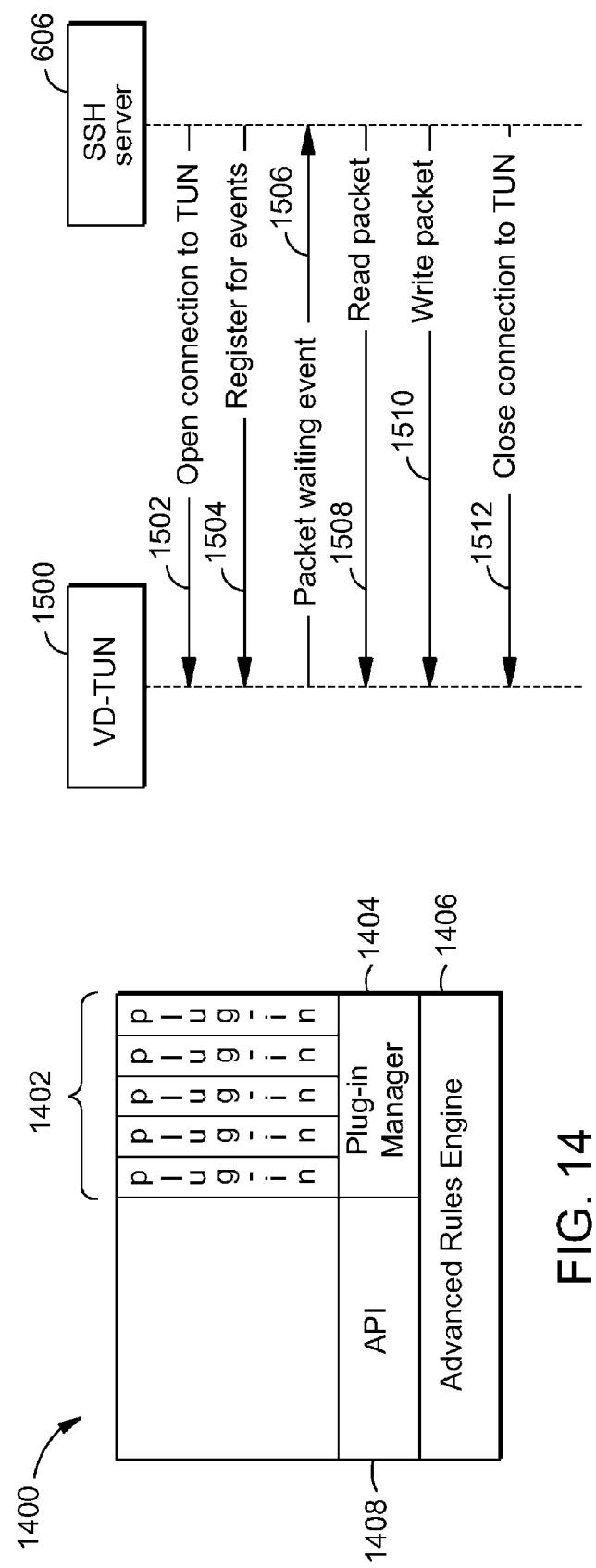

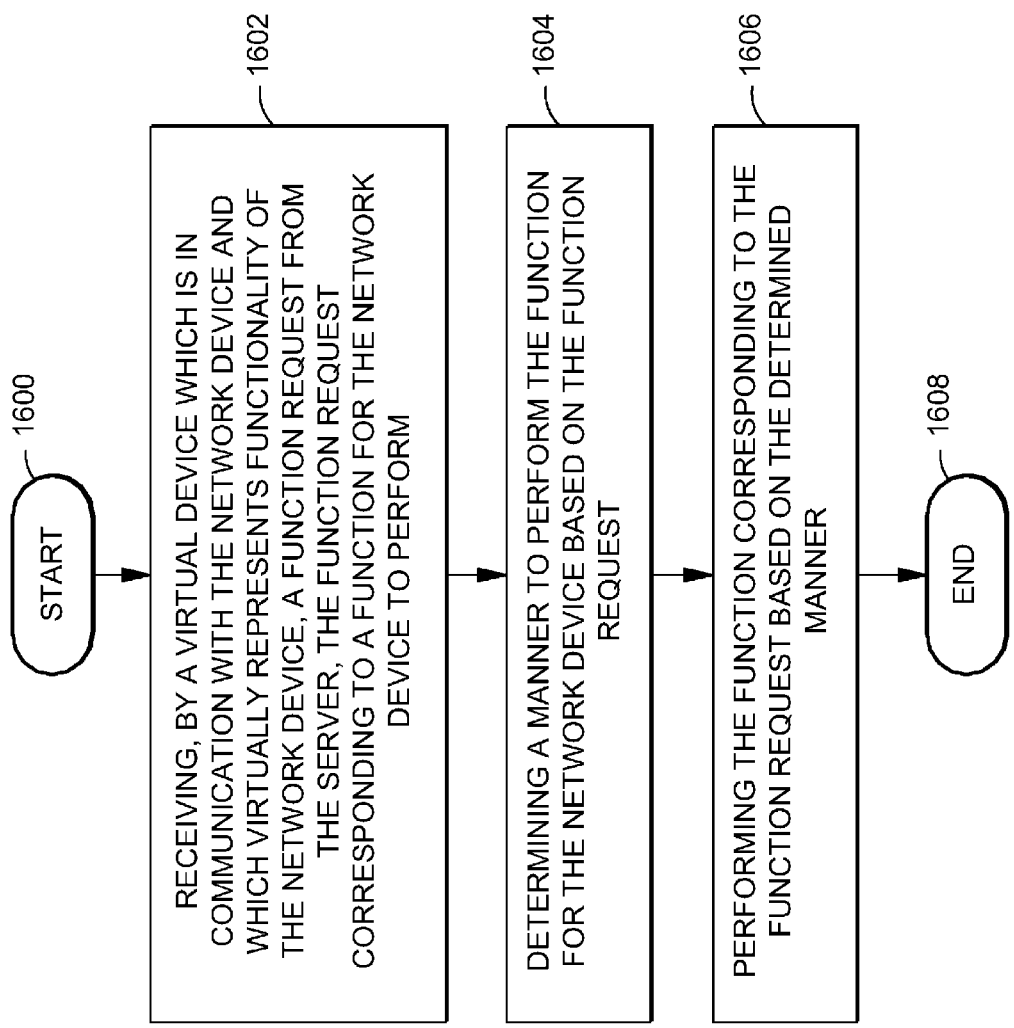

ASSIGNING A NETWORK ADDRESS FOR A VIRTUAL DEVICE TO VIRTUALLY EXTEND THE FUNCTIONALITY OF A NETWORK DEVICE

FIELD

The invention relates to the field of network device functionality, and more particularly relates to virtually extending the functionality of a network device to a server by assigning a network address to a virtual device.

BACKGROUND

Cloud computing is a technology that uses the internet and central remote servers to maintain data and applications. Cloud computing typically allows consumers and businesses to use applications without installation, and to access data at a given computer with internet access. This technology typically allows for more efficient computing by centralizing storage, memory, processing and bandwidth.

The advent of cloud computing has encouraged IT infrastructure to be pushed to servers in data centers managed by external entities. Thus, besides the outsourcing of physical servers, the applications that typically ran within a company's walls have been pushed out to the cloud. However, these applications may need access to network device functionality at the enterprise level. Such access can be affected by firewalls, and by communication delay between the application and a network device.

When an application is hosted in the cloud, an enterprise firewall may separate a network device from a server in the cloud. In such instances, the network device can typically cross the enterprise firewall to access the server. However, the server typically cannot penetrate the firewall to access functionality of the network device.

While it is possible to configure the firewall to have traffic to a specific port be forwarded to a specific device, or to use IPv6 to address a specific device, each of these approaches requires that the firewall be configured to enable the incoming traffic. Further, while a protocol such as UPnP can be used to automatically reconfigure the firewall, not all routers support UPnP, and the firewall must be compromised for this approach to work.

In addition to firewall barriers, the flow of data between a network device and an application can be a time-consuming piece of the application's flow. Reducing the amount of data transferred between the network device and the application may provide for more efficient application flow.

Additionally, problems can be encountered when attempting to bridge network devices communicating over otherwise disconnected networks. For example, an environment can be considered which includes a smart phone that communicates with the Internet through the 3G network, and a projector that communicates with the Internet through a Wi Fi network. Both devices may be able to access the same resources on the Internet, but the devices are not typically able to access each other's resources directly, outside of file transfer via Bluetooth or Infrared.

Thus, for an application in a cloud, there is a desire to provide improved access to functionality of a network device. In addition, there is a desire to provide improved bridging of network devices.

SUMMARY

Disclosed embodiments describe devices and methods for virtually extending the functionality of a network device to a server. A virtual device is created which virtually represents functionality of the network device. An association is stored between the network device and a user or a group for the network device. A determination is made whether the network device and the user or the group for the network device correspond to a local network or to a disparate network, based on the stored association. A network address is assigned for the virtual device based on the determination. Functionality of the network device is accessed via the virtual device, using the assigned network address for the virtual device.

Thus, in an example embodiment described herein, a method for virtually extending the functionality of a network device to a server is provided. The method includes the steps of creating a virtual device which virtually represents functionality of the network device, storing an association between the network device and a user or a group for the network device, and determining whether the network device and the user or the group for the network device correspond to a local network or to a disparate network, based on the stored association. The method further includes the steps of assigning a network address for the virtual device based on the determination, and accessing functionality of the network device via the virtual device, using the assigned network address for the virtual device.

In a further example embodiment, a virtual device for virtually extending the functionality of a network device to a server is provided. The virtual device includes a computer-readable memory constructed to store computer-executable process steps, and a processor constructed to execute the computer-executable process steps stored in the memory. The process steps include storing an association between the network device and a user or a group for the network device, and determining whether the network device and the user or the group for the network device correspond to a local network or to a disparate network, based on the stored association. The process steps further include assigning a network address based on the determination, and accessing functionality of the network device using the assigned network address.

In yet a further example embodiment, a computer-readable memory medium on which is stored computer-executable process steps for virtually extending the functionality of a network device to a server is provided. The process steps include creating a virtual device which virtually represents functionality of the network device, storing an association between the network device and a user or a group for the network device, and determining whether the network device and the user or the group for the network device correspond to a local network or to a disparate network, based on the stored association. The process steps further include assigning a network address for the virtual device based on the determination, and accessing functionality of the network device via the virtual device, using the assigned network address for the virtual device.

The server and the network device can be separated by a firewall. The network device can be remote to the server, and an application on the server can access functionality of the network device via the virtual device in a transparent manner, such that the application does not recognize that the network device is remote.

Network interfaces for the network device can be replicated on the virtual device. The replicated network interfaces on the virtual device can correspond to a virtual network device driver, which is directly or indirectly connected to the network device using a tunneling mechanism. The virtual network device driver can have an IP address accessible to applications residing on the server. The assigning step can assign the network address for the virtual device by assigning the IP address for the virtual network device driver.

The IP address for the virtual network device driver can be assigned the IP address for the network device, in a case where the determining step determines that the network device and the user or the group for the network device correspond to a local network. The IP address for the virtual network device driver can be assigned an arbitrary local subnet address, in a case where the determining step determines that the network device and the user or the group for the network device correspond to a disparate network.

A virtual environment can be created which virtually extends the functionality of plural network devices to a server. In this regard, for each of the plural network devices, the functionality of the network device can be virtually extended to the server with a respective virtual device.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 14 is a block diagram illustrating components for a virtual packet handler which can handle packets for a virtual device according to an example embodiment.

FIG. 15 is a sequence diagram illustrating a sequence for a combined TUN-virtual device according to an example embodiment.

FIG. 16 is a flow diagram which illustrates virtually extending the functionality of a network device to a server according to an example embodiment.

DETAILED DESCRIPTION

Figure 1:
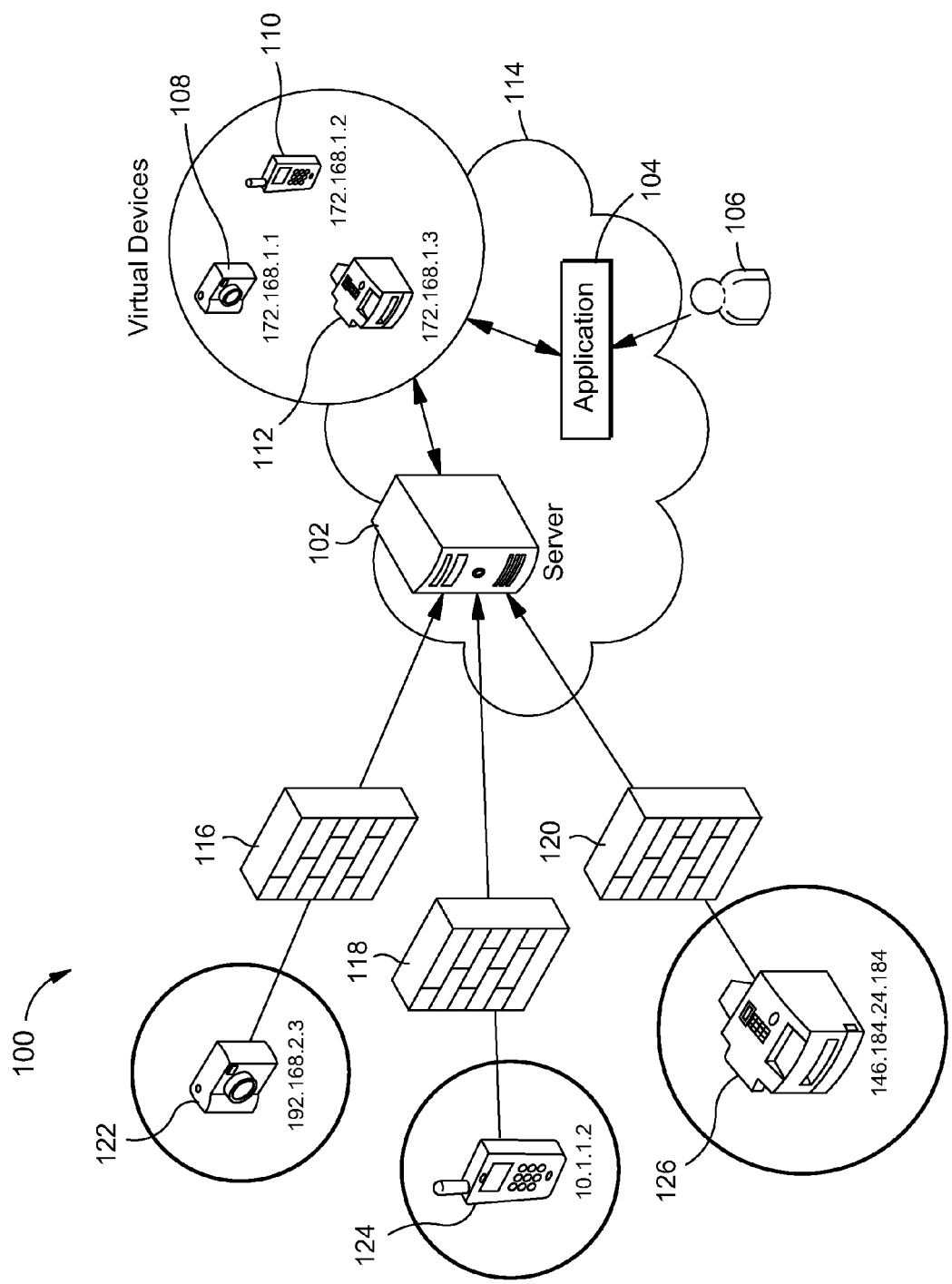
FIG. 1 is a depiction of a network environment according to an example embodiment.

FIG. 1 is a representative view of a network environment relevant to an example embodiment. In the example of FIG. 1, a virtual network is depicted. The virtual network provides for connectivity (e.g., via software-based network links) between two or more of its component nodes. In general, the virtual network configuration of FIG. 1 can allow for communication between nodes which typically cannot be linked by normal physical means, For example, due to the use of firewalls.

However, the server typically cannot penetrate the firewall to access device functionality. One solution can be to configure the firewall/router to have traffic to a specific port be forwarded to a specific device. Alternatively, Internet Protocol version 6 (IPv6) can be used to address a specific device. However, with these approaches, the firewall must typically be configured to enable this incoming traffic. In addition, while a protocol such as Universal Plug and Play (UPnP) can be used to automatically reconfigure the firewall, not all routers support UPnP. Further, the firewall must typically be compromised for this approach to work.

As such, applications in a cloud may need access to network devices at the enterprise level, but these network devices may exist on networks protected by firewalls which typically prevent the applications from directly contacting the network devices. In this regard, the network devices may need to initiate the establishment of the communication path.

FIG. 1 illustrates an example high level design of how a virtual device might be utilized in an SSH-TUN (Secure Shell-TUNnel) network system. In FIG. 1, a virtual device model is used in a cloud 114, to enable interaction between a server 102 and network devices 122, 124 and 126.

As can be seen in FIG. 1, network environment 100 can correspond to an internet cloud computing environment, where server 102 can be included in cloud 114. Server 102 can access network devices, such as network camera 122, network cellular phone 124 and network printer 126. Server 102 may have direct access to network devices 122 to 126. Alternatively, there may be firewalls 116, 118 and 120 which can impede direct connection between server 102 and network devices 122, 124 and 126, respectively. In this case, server 102 must typically traverse the appropriate firewall to access functionality of the respective network device.

Cloud 114 can further include virtual devices, such as virtual camera 108, virtual cellular phone 110 and virtual printer 112. Virtual devices 108 to 112 can be accessible by server 102. In addition, each of virtual devices 108 to 112 can correspond to a respective one of network devices 122, 124 and 126, and access the respective functionality for that network device. For example, virtual camera 108 can access the functionality of network camera 122, virtual cellular phone 110 can access the functionality of network cellular phone 124, and virtual printer 112 can access the functionality of network printer 126. Virtual devices 108 to 112 can reside on server 102.

Cloud 114 can further include an application 104 which may require access to the functionality of one or more of network devices 122 to 126. A user can access application 104 via a user device 106, which can be outside or inside cloud 114. In turn, application 104 can access the required functionality for network devices 122 to 126, via respective virtual devices 108 to 112. User device 106 can correspond to a personal computer, web browser, cellular phone, or another type of device requiring access to network device functionality.

The flow of data between network devices 122 to 126 and application 104 in cloud 114 can be a time-consuming piece of the application's flow. In this regard, some data is typically available on a network device before application 104 requests it, for example, the device name, device model and current status. The flow of data to application 104 can be improved by uploading pertinent device data to virtual devices 108 to 112 ahead of any application request. Virtual devices 108 to 112 can monitor network packets sent to network devices 122 to 126, and can intercept those requests which they are capable of handling.

Each of virtual devices 108 to 112 can be viewed as an application running on server 102, networked between an actual network device 122 to 126 and an application 104 that needs to communicate with network device 122 to 126. Virtual device 108 to 112 can act as a middle man between application 104 and network device 122 to 126, to aid in the flow of data. Each of virtual devices 108 to 112 can also be used for other purposes related to network device interaction.

Virtual devices 108 to 112 can be used to improve the security and performance of network environment 100. Implementing virtual devices 108 to 112 can allow for control over the packets application 104 is trying to send to respective network devices 122 to 126. For example, virtual device 108 to 112 may find a request to retrieve a file from network device 122 to 126 that it had previously stored locally on server 102. Virtual device 108 to 112 can return the file to application 104 without involving the network device itself.

Thus, network environment 100 can be used to more securely tunnel network traffic between server 102 on the internet and network devices 122 to 126, which can be located behind respective firewalls 116 to 120. This network traffic can correspond, for example, to requests from application 104 for network device functionality.

As noted above, FIG. 1 illustrates an example high level design of how a virtual device model may be implemented in a SSH-TUN (Secure Shell-TUNnel) network system. In a SSH-TUN network system, actual device status can be retrieved using SNMP, a non-encrypted protocol. If SNMP is used remotely through the Internet, it may be possible for another user on the connection to access device information. Thus, to more securely obtain device status, an SSH tunnel can be established to route all SNMP traffic to the remote networked device through an encrypted channel. Even though the SNMP protocol itself typically contains no encryption, the encrypted SSH channel through which it travels can offer security.

However, it should be noted that other networking techniques besides SSH-TUN can be used to allow cloud applications direct access to network devices. One example is a reverse port forwarding technique, which can use SSH and a proprietary HTTP-based protocol. Another example is to setup a Virtual Private Network (VPN) between a server in the cloud and the device or a server in the enterprise, as will be described in greater detail later.

Figure 2:
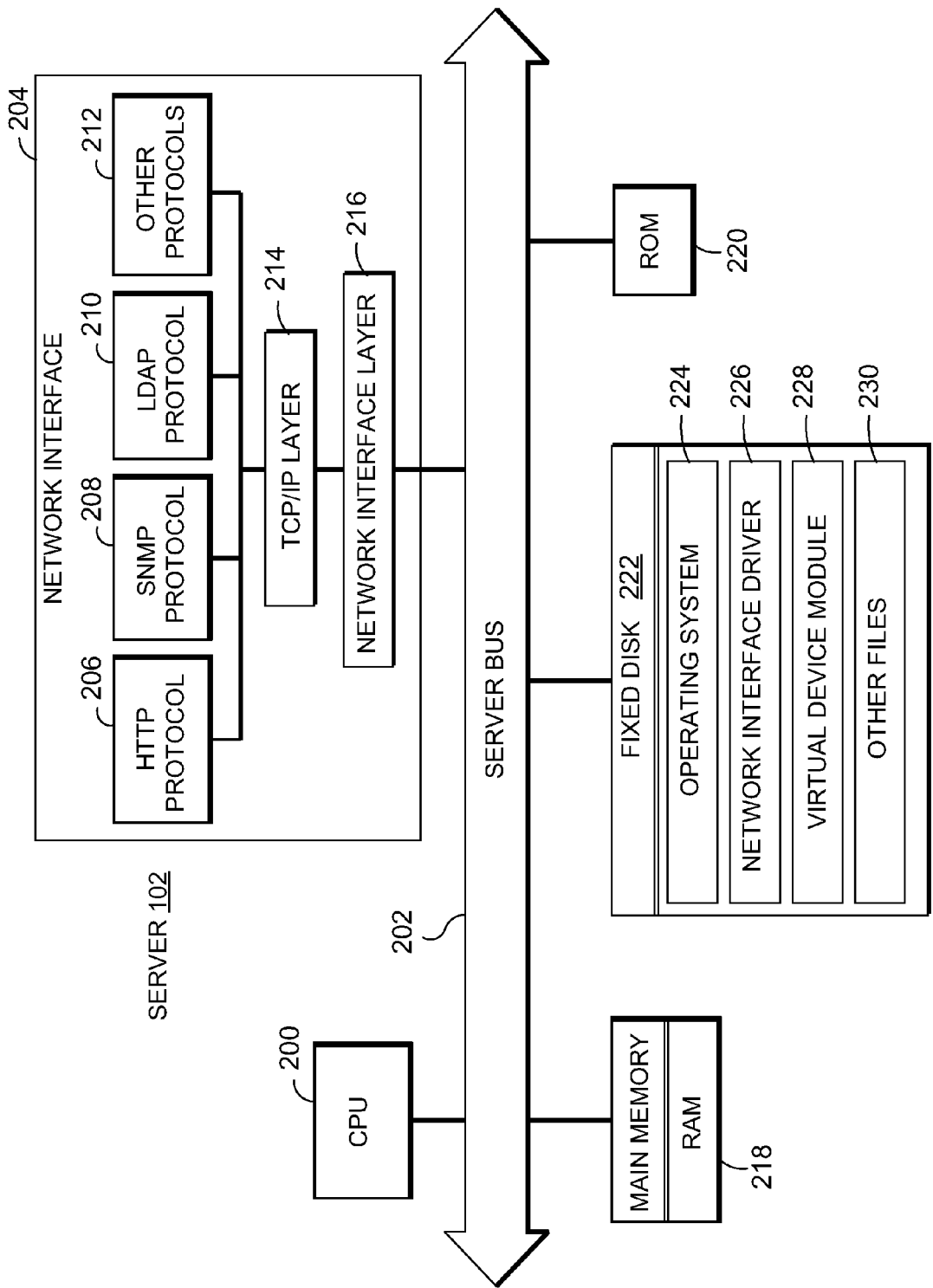
FIG. 2 is a block diagram depicting the internal architecture of the server shown in FIG. 1 according to an example embodiment.

FIG. 2 is a block diagram depicting the internal architecture of the server shown in FIG. 1 according to an example embodiment. As can be seen in FIG. 2, server 102 can include a central processing unit ("CPU") 200 such as a programmable microprocessor which can be interfaced to server bus 202. Also coupled to server bus 202 can be a network interface 204 for interfacing to network devices 122 to 126, or user device 106. In addition, random access memory ("RAM") 218, fixed disk 222, and read-only memory ("ROM") 220 can be coupled to server bus 202. RAM 218 can interface to server bus 202 to provide CPU 200 with access to memory storage, thereby acting as a main run-time memory for CPU 200. In particular, when executing stored program instruction sequences, CPU 200 can load those instruction sequences from fixed disk 222 (or other memory media) into RAM 218 and execute those stored program instruction sequences out of RAM 218. It should also be recognized that standard disk-swapping techniques can allow segment of memory to be swapped to and from RAM 218 and fixed disk 222.

ROM 220 can store invariant instruction sequences, such as start-up instruction sequences for CPU 200 or basic input/output operating system ("BIOS") sequences for the operation of network devices which may be attached to server 102. Network interface 204 can contain several modules to provide the appropriate interface functionality for server 102. For example, network interface 204 can contain network interface layer 216, which is typically a low-level protocol layer. TCP/IP layer 214 can be provided above network interface layer 216 for communicating over a network with network devices 122 to 126 or user device 106 via TCP/IP, a standard network protocol. Other protocols 212 can also be provided to allow server 102 to communicate to over the network using other conventional protocols. In this regard, it is possible for HTTP protocol 206, SNMP protocol 208, and LDAP protocol 210 to be provided in network interface 204 for allowing server 102 to communicate to over a network using HTTP, SNMP and LDAP, respectively. However, it should be noted that HTTP, SNMP and LDAP protocols, along with other conventional protocols, can instead be provided by operating system 224. The foregoing protocols can allow for server 102 to communicate over a network (e.g., the Internet) with other devices (e.g., network devices 122 to 126, or user device 106).

Fixed disk 222 is one example of a computer-readable medium that stores program instruction sequences executable by CPU 200 so as to constitute operating system 224, network interface driver 226, virtual device module 228 and other files 230. Operating system 224 can be an operating system such as DOS, Windows 95, Windows 98, Windows 2000, Windows XP, Windows 7, Windows NT, UNIX, or other such operating system. Network interface driver 226 can be utilized to drive network interface 204 for interfacing server 102 to network devices 122 to 126, or user device 106. Virtual device module 228 can be utilized to implement the architecture for virtual devices, which as described above, can virtually extend the functionality of network devices 122 to 126 to server 102. Other files 230 can contain other files or programs necessary to operate server 102 and/or to provide additional functionality to server 102.

Figure 3:
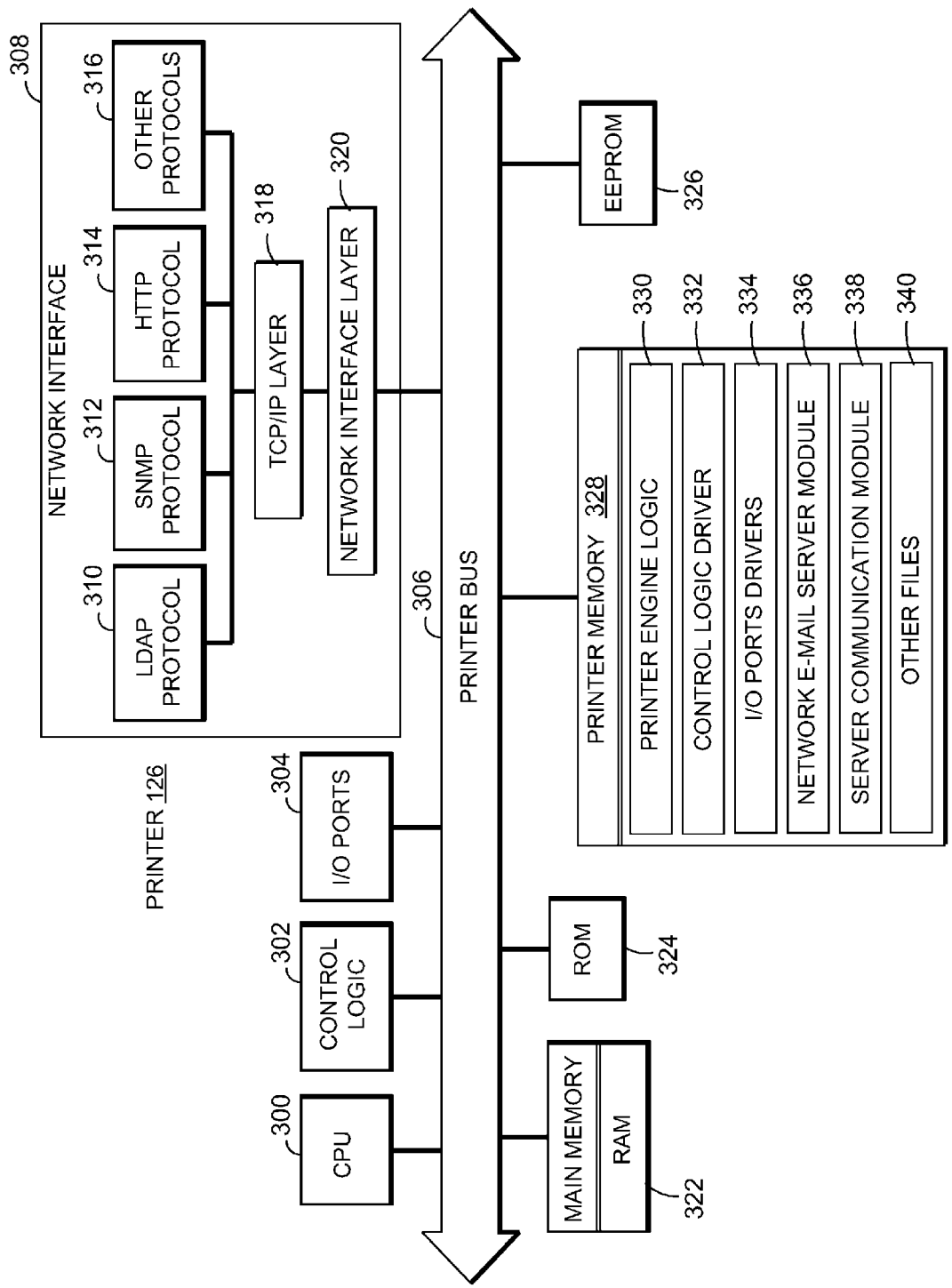
FIG. 3 is a block diagram depicting the internal architecture of the printer shown in FIG. 1 according to an example embodiment.

FIG. 3 is a block diagram depicting the internal architecture of the printer shown in FIG. 1 according to an example embodiment. Network printer 126 is one example of a network device from which functionality can be requested by application 104. Of course, other network devices can be used, such as network camera 122, network cellular phone 124 or another type of network device. However, the internal architectures for these other types of devices will not be described with the same amount of detail as network printer 126.

As can be seen in FIG. 3, network printer 126 can contain a central processing unit ("CPU") 300 such as a programmable microprocessor which can be interfaced to printer bus 306. Also coupled to printer bus 306 can be control logic 302 which can be utilized to control a printer engine (not shown) of network printer 126, I/O ports 304 which can be used to communicate with various input/output devices (not shown) of network printer 126, and network interface 308 which can be utilized to interface network printer 126 to a network, for example, to connect to server 102. Network interface 308 can contain several modules to provide the appropriate interface functionality for network printer 126.

In particular, network interface 308 can contain network interface layer 320 which is typically a low-level protocol layer to interface with a network. TCP/IP layer 318 can be provided above network interface layer 320 for communicating over the network via TCP/IP, a standard network protocol. In the next layer of network interface 320, it is possible for HTTP protocol 314, SNMP protocol 312 and LDAP protocol 310 to be provided for allowing network printer 126 to communicate with server 102 using HTTP, SNMP and LDAP protocols. However, it should be noted that HTTP, SNMP and LDAP protocols, along with other conventional protocols, can instead be provided in printer memory 328. The foregoing protocols can allow for printer 126 to communicate over a network (e.g., the Internet) with other devices (e.g., server 102). In addition, other protocols 316 can be provided to allow network printer 126 to communicate with server 102.

Also coupled to printer bus 306 can be EEPROM 326, for containing nonvolatile program instructions, random access memory ("RAM") 322, printer memory 328 and read-only memory ("ROM") 324. RAM 322 can interface to printer bus 306 to provide CPU 300 with access to memory storage, thereby acting as the main run-time memory for CPU 300. In particular, when executing stored program instruction sequences, CPU 300 can load those instruction sequences from printer memory 328 (or other memory media) into RAM 322 and execute those stored program instruction sequences out of RAM 322. ROM 324 can store invariant instruction sequences, such as start-up instruction sequences for CPU 300 or BIOS sequences for the operation of various network device devices (not shown) of network printer 126.

Printer memory 328 is one example of a computer-readable medium that can store program instruction sequences executable by CPU 300 so as to constitute printer engine logic 330, control logic driver 332, I/O port drivers 334, network e-mail server module 336, and other files 338. Printer engine logic 330 and control logic driver 332 can be utilized to control and drive a printer engine (not shown) of network printer 126 so as to print an image according to image data received by network printer 126. I/O port drivers 334 can be utilized to drive the input and output devices (not shown) connected through I/O ports 304. Network e-mail server module 336 can be provided to support a network e-mail application for e-mail printing capability, and the like. Server communication module 338 can be provided for communication between network printer 126 and server 102. In addition, other files 340 can be used to provide other information and programs necessary for the operation and functionality of network printer 126.

Figure 4:
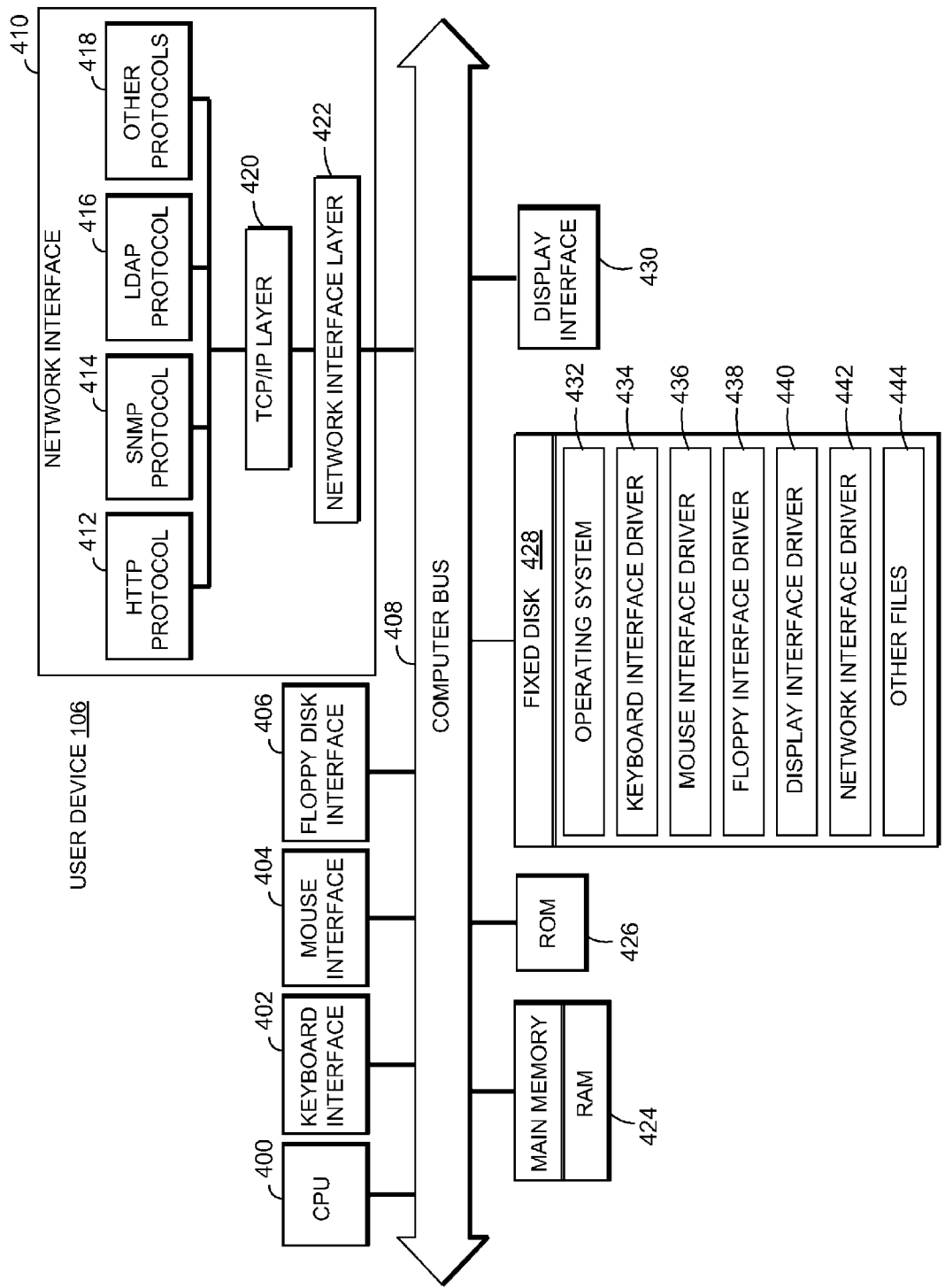
FIG. 4 is a block diagram depicting the internal architecture of the user device in FIG. 1 according to an example embodiment.

FIG. 4 is a block diagram depicting the internal architecture of the user device in FIG. 1 according to an example embodiment. In the example of FIG. 4, user device 106 corresponds to a personal computer. However, as mentioned above, user device 106 can correspond to other devices, such as a web browser, cellular phone or another type of device. However, the internal architectures for these other types of devices will not be described with the same amount of detail as personal computer 106.

Personal computer 106 can be used in the network environment of FIG. 1 to access functionality of network devices 122 to 126. As can be seen in FIG. 4, personal computer 106 can include central processing unit (CPU) 400 such as a programmable microprocessor which can be interfaced to computer bus 408. Also coupled to computer bus 408 can be keyboard interface 402 for interfacing to a keyboard, mouse interface 404 for interfacing to a pointing device, such as a mouse, floppy disk interface 406 for interfacing to a floppy disk, display interface 430 for interfacing to a display, and network interface 410 for interfacing to a network, for example, to connect to server 102. Network interface 410 can contain several modules to provide the appropriate interface functionality for personal computer 106.

In particular, network interface 410 can contain network interface layer 422 which can be a low-level protocol layer to interface with a network (e.g., to communicate with server 102). TCP/IP layer 420 can be provided above network interface layer 422 for connecting to a network via TCP/IP, a standard network protocol. Other protocols 418 can also be provided to allow personal computer 106 to communicate over a network using other conventional protocols. In this regard, it is possible for HTTP protocol 412, SNMP protocol 414 and LDAP protocol 416 to be provided in network interface 410 for allowing personal computer 106 to communicate over a network via HTTP, SNMP and LDAP protocols. However, it should be noted that HTTP, SNMP and LDAP protocols, along with other conventional protocols, can instead be provided by operating system 432.

Random access memory ("RAM") 424 can interface to computer bus 408 to provide central processing unit ("CPU") 400 with access to memory storage, thereby acting as the main run-time memory for CPU 400. In particular, when executing stored program instruction sequences, CPU 400 can load those instruction sequences from fixed disk 428 (or other memory media) into random access memory ("RAM") 424 and execute those stored program instruction sequences out of RAM 424. It should also be noted that standard-disk swapping techniques available under windowing operating systems can allow segments of memory to be swapped to and from RAM 424 and fixed disk 428. Read-only memory ("ROM") 426 can store invariant instruction sequences, such as start-up instruction sequences for CPU 400 or basic input/output operation system ("BIOS") sequences for the operation of network device devices attached to personal computer 106.

Fixed disk 428 is one example of a computer-readable medium that can store program instruction sequences executable by central processing unit ("CPU") 400 so as to constitute operating system 432, keyboard interface driver 434 for driving keyboard interface 402, mouse interface driver 436 for driving mouse interface 404, floppy disk interface driver 438 for driving floppy disk interface 406, display interface driver 440 for driving display interface 430, network interface driver 442 for driving network interface 410, and other files 444. Operating system 432 can be a windowing operating system, such as Windows 95, Windows 98, Windows 2000, Windows XP, Windows 7, Windows NT, or other such operating system, although other types of operating systems such as DOS, UNIX and LINUX may be used with the present invention. Other files 444 contain other information and programs necessary for personal computer 106, to operate and to add additional functionality to personal computer 106.

User device 106 can be used to access application 104, which may require access to the functionality of network devices 122 to 126. Application 104 can be used in conjunction with virtual device module 228, to exchange data between network devices 122 to 126, even if server 102 and network devices 122 to 126 are separated by one or more firewalls 116 to 120. In this regard, application 104 can be in cloud 114 or alternatively, outside of cloud 114. For example, application 104 can be stored in memory in user device 106.

Figure 5:
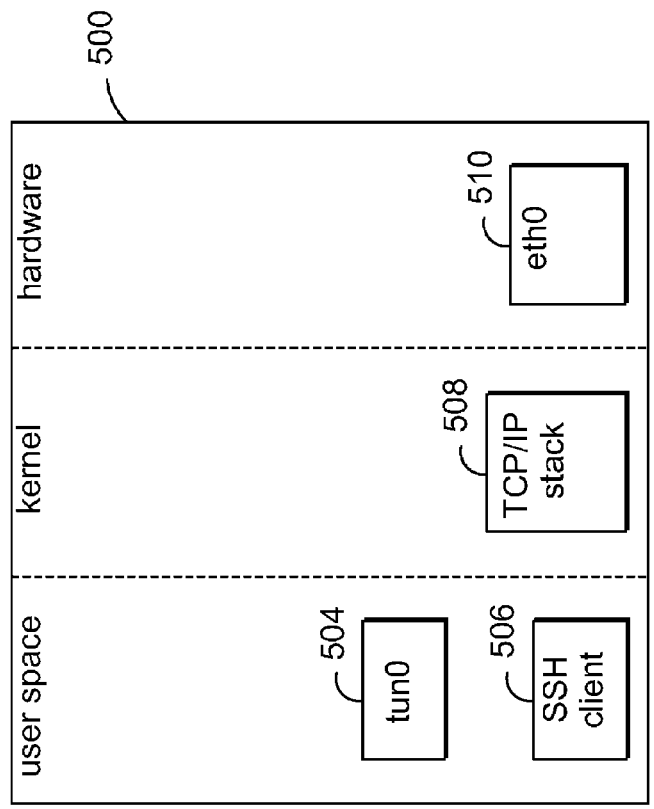
FIG. 5 is a block diagram illustrating components which correspond to a network device and which can be used for connecting with a server according to an example embodiment.

FIG. 5 is a block diagram illustrating components which correspond to a network device and which can be used for connecting with a server according to an example embodiment. Network device 500 corresponds to a general network device which is in communication with server 102. For example, network device 500 can correspond to any of network devices 122 to 126 in FIG. 1.

SSH can be used to allow for data exchange between network device 500 and server 102. As such, network device 500 typically requires an SSH client 506 and a TUN driver. A TUN driver can correspond to a virtual network kernel driver that creates a network device completely in software, so that there is no associated hardware network adapter. A TUN typically operates on layer 3 packets, such as IP packets and is used in routing traffic. In this regard, a TUN for network device 500 can be represented by tun0 504, and can be used as a virtual network tunnel device. Furthermore, network device 500 can include a TCP/IP stack 508, and a network interface card, represented by eth0 510.

Figure 6:
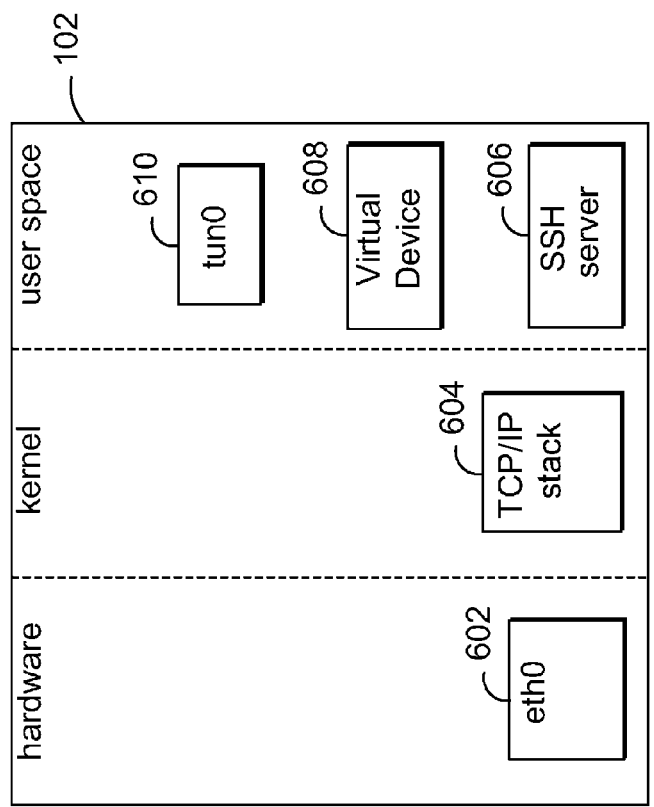
FIG. 6 is a block diagram illustrating components which correspond to a server and which can be used for connecting with a network device according to an example embodiment.

FIG. 6 is a block diagram illustrating components which correspond to a server and which can be used for connecting with a network device according to an example embodiment. Server 102 typically requires an SSH server 606 and a TUN driver (corresponding to tun0 610, which represents the virtual network tunnel device). Furthermore, eth0 602 represents a network interface card. In addition, server 102 can include a virtual device 608 and a TCP/IP stack 604.

Figure 7:
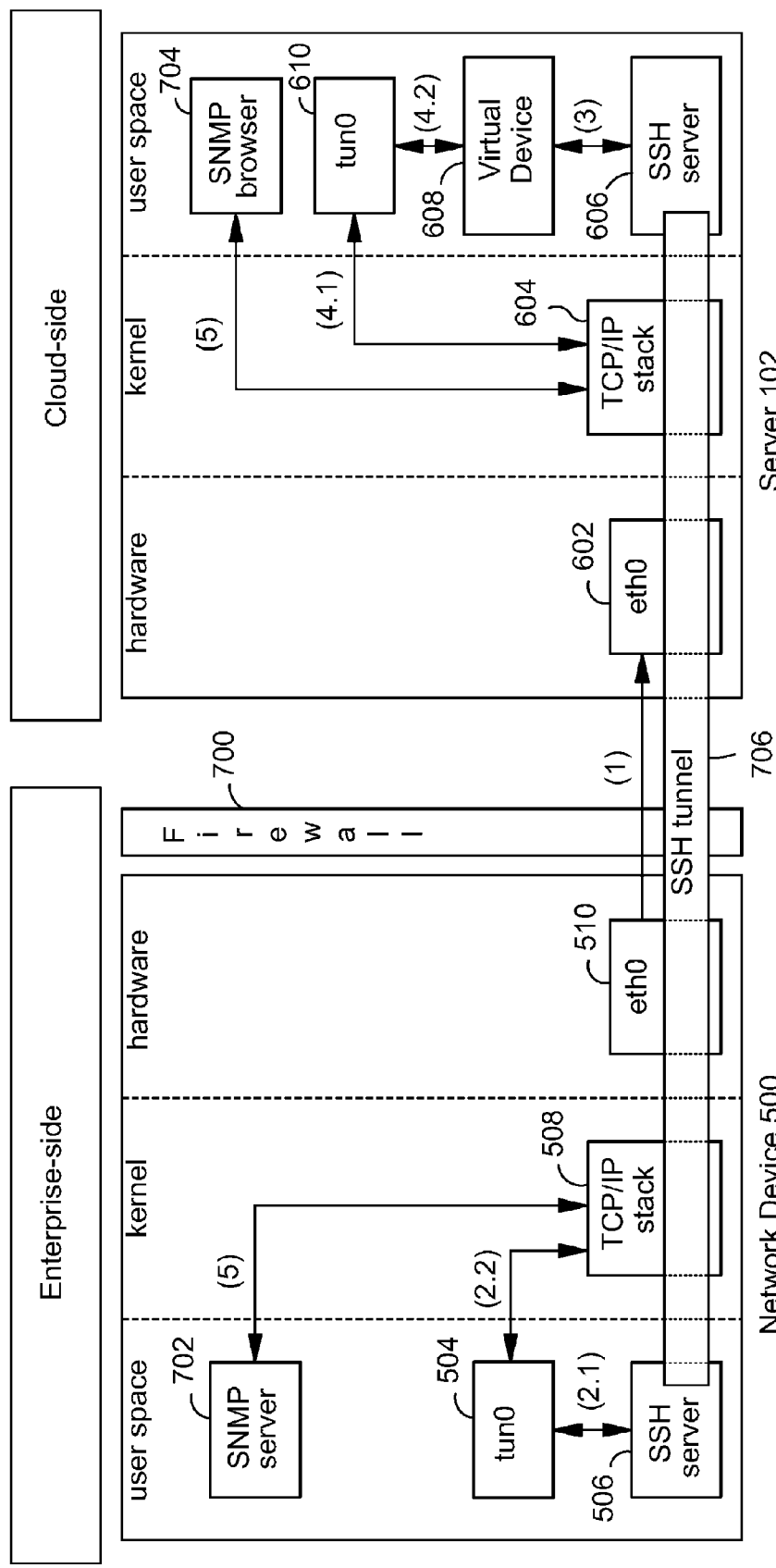
FIG. 7 is a block diagram illustrating SSH connectivity between a network device and a server according to an example embodiment.

FIG. 7 is a block diagram illustrating SSH connectivity between the network device and a server according to an example embodiment. In this example, FIG. 7 illustrates connectivity between the components shown in FIGS. 5 and 6.

As mentioned above, SSH can be used to allow for data exchange between network device 500 and server 102. Network device 500 can be capable of hosting an SSH client 506 and a TUN driver, and server 102 can be capable of hosting an SSH server 606 and TUN driver. By utilizing SSH, network device 500 can access server 102.

FIG. 7 illustrates a basic usage example for initializing network device 500 and server 102. Upon initialization, network device 500 can be setup to make an SSH connection, depicted as line "(1)", to server 102. Using an Ethernet connection via network interface card eth0 510, SSH client 506 and SSH server 606 can establish a secure tunnel, depicted as SSH tunnel 706.

As part of the network device initialization, a TUN device (tun0 504) can be setup and a connection (2.1) can made between it and SSH client 506. For example, tun0 504 can be given the IP address 10.254.254.2. Furthermore, tun0 504 can be setup with target point to point IP address of 10.254.254.1, which can be the tun0 610 IP address on server 102.

Upon initialization of SSH server 606 from SSH client 506, a virtual device instance 608 can be started. Alternatively, virtual device instance 608 may be created at initial device registration. As noted above, virtual device 608 can be in communication with network device 500 and virtually represents functionality of network device 500. For example, virtual device 608 can correspond to virtual devices 108 to 112 of FIG. 1.

When network device 500 is disconnected from server 102, the virtual device TUN (tun0 610) is typically disabled and hence cannot be accessed through its IP address. However, information about the registered network device 500 can be retrieved from other API provided by server 102. For example, the serial number of network device 500 can be used to identify network device 500.

As part of the virtual device initialization, tun0 610 can be setup and a connection (4) can be made between it and virtual device 608. For example, tun0 610 can be given the IP address 10.254.254.1 as noted above. Furthermore, tun0 610 can be setup with target point to point IP address of 10.254.254.2, which can be the tun0 504 IP address on network device 500.

By virtue of the foregoing setup in this example, an application (e.g., application 104 of FIG. 1) on server 102 can communicate with network device 500 using IP address 10.254.254.2. Further, SNMP browser application 704 can send a command via connection (5) to port 161 on 10.254.254.2. For connection (4.1), TCP/IP stack 604 can transfer that request to tun0 610, which can be monitored by virtual device 608. Virtual device 608 can then take the IP network traffic from tun0 610 via connection (4.2), and pass it to SSH server 606 via connection (3). The request can in turn get tunneled to SSH client 506 on network device 500, passed to tun0 504 via connection (2.1), and then on to TCP/IP stack 508 via connection (2.2). The request can then get passed via connection (5) to an application monitoring port (e.g., UDP port 161), for SNMP server 702. A response by SNMP server 502 can then follow the reverse path back to SNMP browser 704. As such, functionality of network device 500 can be accessed by server 102, even if network device 500 is positioned behind firewall 700.

Figure 8:
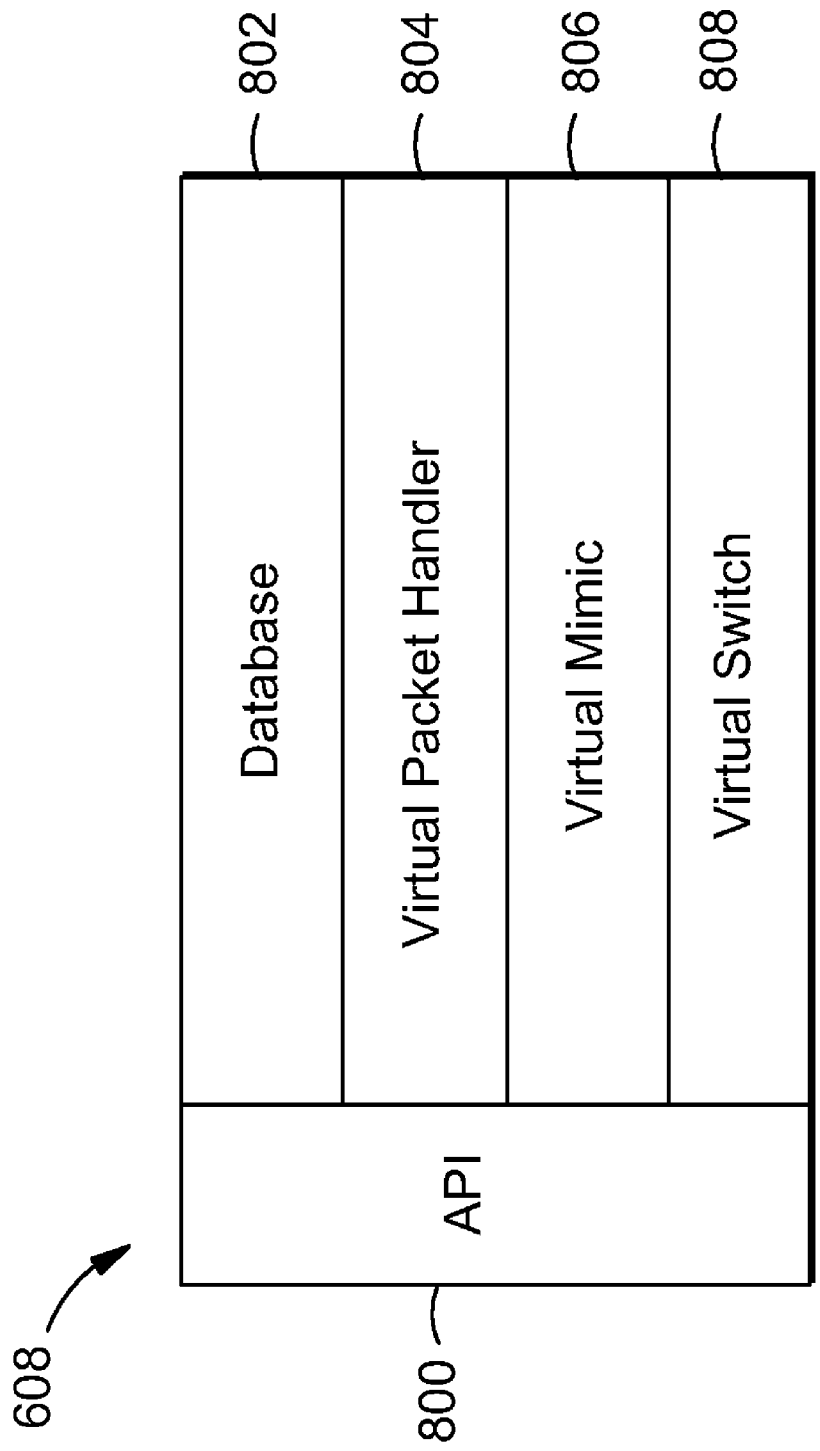
FIG. 8 is a block diagram illustrating components for a virtual device which can be used to virtually extend the functionality of a network device to a server, according to an example embodiment.

FIG. 8 is a block diagram illustrating components for a virtual device which can be used to virtually extend the functionality of a network device to a server, according to an example embodiment. As noted above, virtual device 608 can allow for an application to communicate with network device 500, as if network device 500 were on the same network. In this regard, virtual device 608 can be implemented with functionality to improve packet travel time and computational efficiency.

As can be seen in FIG. 8, virtual device 608 typically includes an application programming interface (API) 800. API can be used to communicate with application 104, for example. Virtual device 608 can further include a database 802. In addition, virtual device 608 can include other modules for implementing additional features, including virtual packet handler 804, virtual mimic 806 and virtual switch 808. The functionality of modules 804 to 808 will be described in further detail below.

Figure 9:
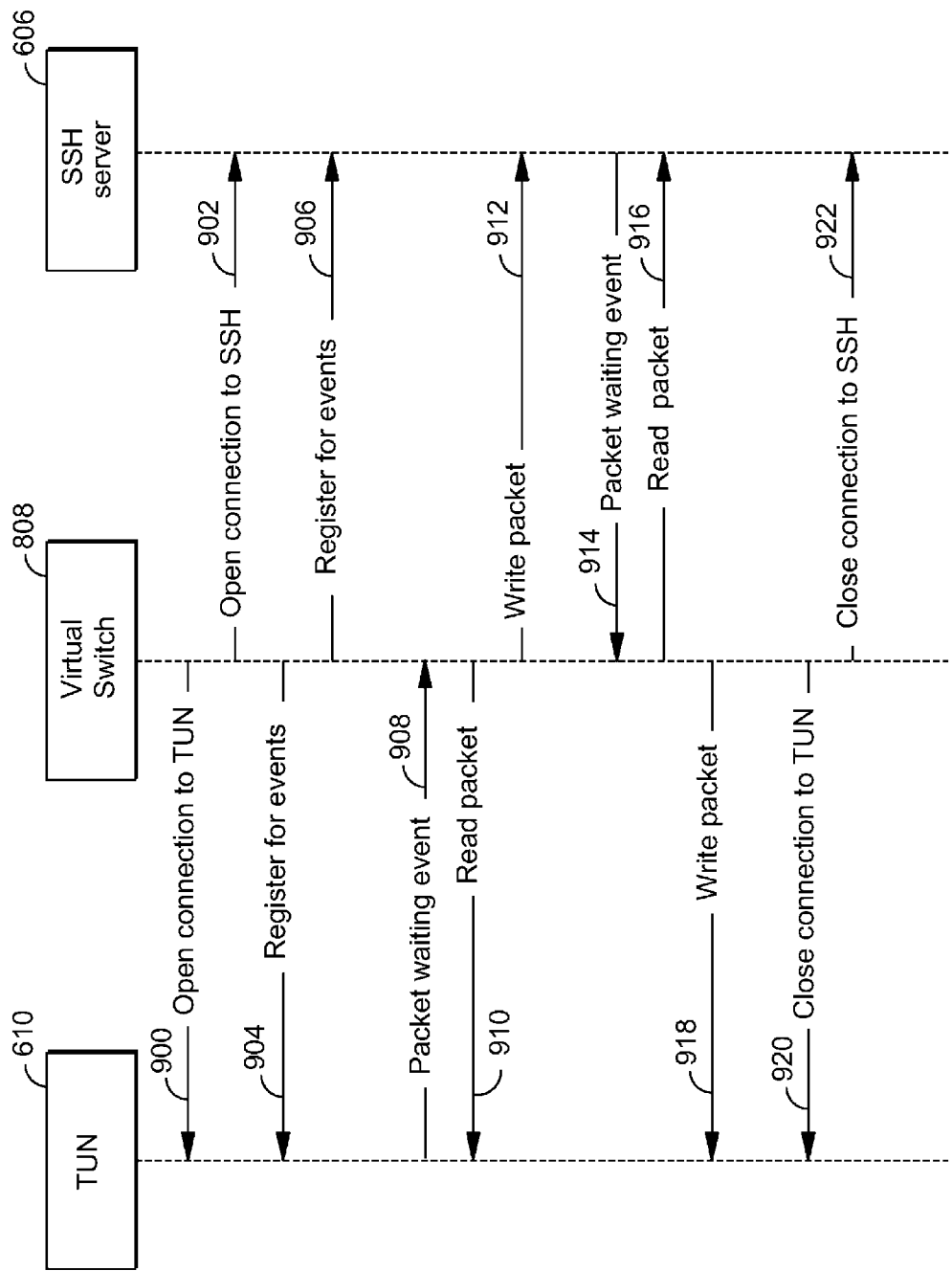
FIG. 9 is a sequence diagram illustrating a sequence for a virtual switch of a virtual device according to an example embodiment.

FIG. 9 is a sequence diagram illustrating a sequence for a virtual switch of a virtual device according to an example embodiment. Virtual switch 808 can correspond to a low-level component of virtual device 608. Virtual switch can act as a pass through between TUN (tun0 610) and SSH server 606.

At the startup of virtual switch 808, any required initialization including configuration can be performed. There may be static or dynamic configuration information stored in a database (e.g., database 802), and virtual device 608 can load this information at startup. Virtual device 608 may also register itself in a database, for example with the identity of the network device 500 to which it is connected, the local and remote IP addresses for network device 500, the real and virtual capabilities of network device 500, and other necessary registration information.

Virtual switch 808 can be used to provide inbound and outbound functions and methods for communicating incoming and outgoing IP traffic. As can be seen in sequence step 900 of FIG. 9, the TUN (tun0 610) can be opened for reading an IP packet from TCP/IP stack 604 or writing an IP packet to TCP/IP stack 604.

In sequence step 902, a connection to the SSH server 606 can be opened for reading an IP packet from SSH server 606 or writing an IP packet to SSH server 606. Regarding sequence steps 904 and 906, registration for events can be performed. For example, such registration can be for receiving notification (e.g., a select call) from the TUN (tun0 610) and SSH server 606 that there is a need to handle an outgoing IP packet from TUN (tun0 610) or an incoming IP packet from SSH server 606. This will be described in further detail below.

Event loop waiting for notification from TUN (tun0 610) or SSH server 606 will now be described. For performance reasons, this can alternatively be a kernel task, as described later with reference to FIG. 15.

From sequence step 908, upon notification from TUN (tun0 610), an outgoing IP packet from TUN (tun0 610) can be read at sequence step 910. At sequence step 912, an outgoing IP packet can be written to SSH server 606.

In addition, from sequence step 914, upon notification from SSH, an incoming IP packet can be read from SSH server 606 at sequence step 916, and an incoming IP packet can be written to TUN (tun0 610) at sequence step 918.

Furthermore, when the event loop exits, a shutdown procedure can be performed, including sequence step 920 for closing connection to TUN (tun0 610) and sequence step 922 for closing connection to SSH server 606.

Figure 10:
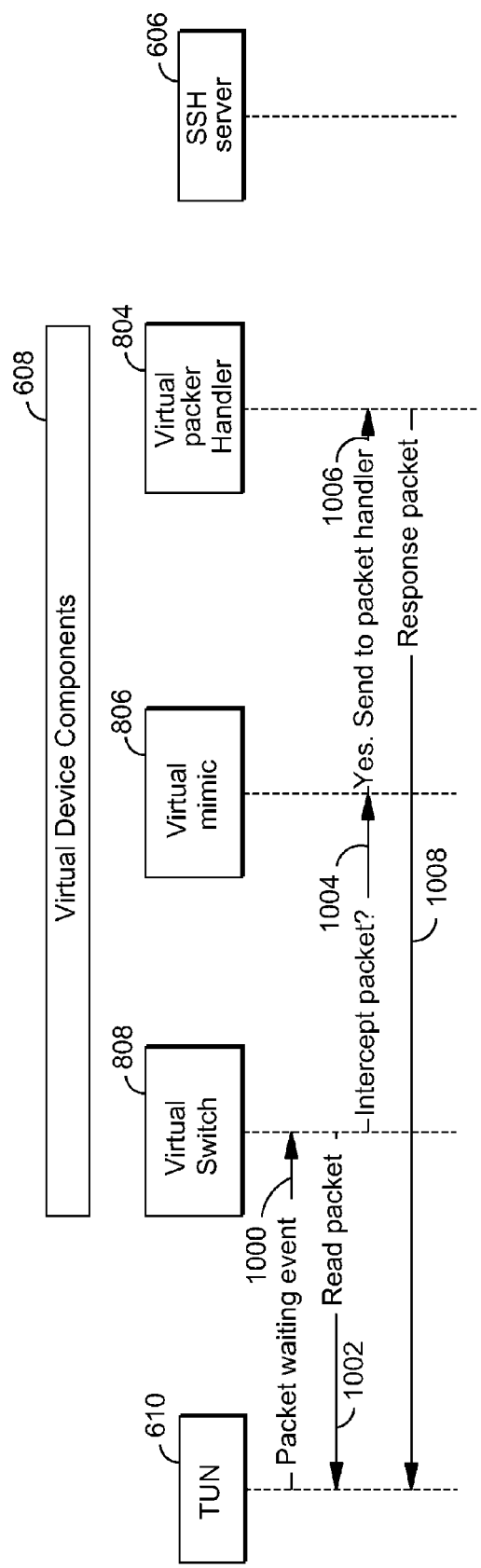
FIG. 10 is a sequence diagram illustrating a sequence for an intercepted packet according to an example embodiment.

FIG. 10 is a sequence diagram illustrating a sequence for an intercepted packet according to an example embodiment. As described above with reference to FIG. 9, virtual switch 808 can provide for a pass through between TUN (tun0 610) and SSH server 606. Such pass through of data packets may result in added packet travel time. As such, virtual device 608 can implement additional logic for reducing the amount of added packet travel time.

For example, virtual device 608 can include virtual mimic module 806. In this regard, discussion of the mimicking of network devices can be found in U.S. Pat. No. 7,552,239, filed May 14, 2001, titled "Network Device Mimic Support", by Sebastien Jean, et al., the contents of which are incorporated by reference herein.

U.S. Pat. No. 7,552,239 describes receiving an incoming message from a client network device residing on an external network, the incoming message being directed to a legacy network device residing on the local network, and determining if the incoming message requires a function provided by an application module residing in the computing device. In the case that the incoming message requires a function provided by the application module, the incoming message is redirected to the application module which performs the required function in response to the incoming message. In the case that the incoming message does not require a function provided by the application module, the incoming message is passed through the local network to the legacy network device residing on the local network.

Thus, U.S. Pat. No. 7,552,239 is seen to describe the monitoring of network packets between two interface cards, one of which is wired to the device itself. However, for the virtual mimic described herein, the monitoring of network packets can take place on a virtual network located off the network device.

For example, virtual mimic module 806 can monitor network packets on the virtual network located off network device 500. The virtual mimic functionality can be added in the event loop of above design described for virtual switch 808 (i.e., the loop defined by sequence steps 908 to 918 of FIG. 9). In addition, the configuration of virtual mimic 806 and its rules processing can be handled from a database (e.g., database 802).

The value in virtual mimic 806 can be in the implementation of a faster rules engine used to process the packets. If a packet fails all rules, it can be quickly put back on the virtual wire to network device 500. The basic design of the addition of virtual mimic 806 and virtual packet handler 804 will now be described with reference to FIG. 10.

At sequence step 1000, event loop waiting for notification from TUN (tun0 610) or SSH server 606 can be entered into. Upon notification from TUN (tun0 610), an outgoing IP packet can be read from TUN (tun0 610) at sequence step 1002. In sequence step 1004, virtual mimic 806 can determine whether the packet should be intercepted, based on whether the packet passes rules corresponding to fast rules engine processing. If the packet passes a rule, the packet can be written to virtual packet handler 804 at sequence step 1006. In sequence step 1008, virtual packet handler 804 can send a response packet to TUN (tun0 610).

FIG. 10 illustrates an example where a simple packet can be intercepted and processed by virtual device 608. For example, this can correspond to an SNMP packet requesting the model of network device 500. However, if the packet fails all rules, the packet can be written to SSH server 606 for handling, as shown in FIG. 11.

Figure 11:
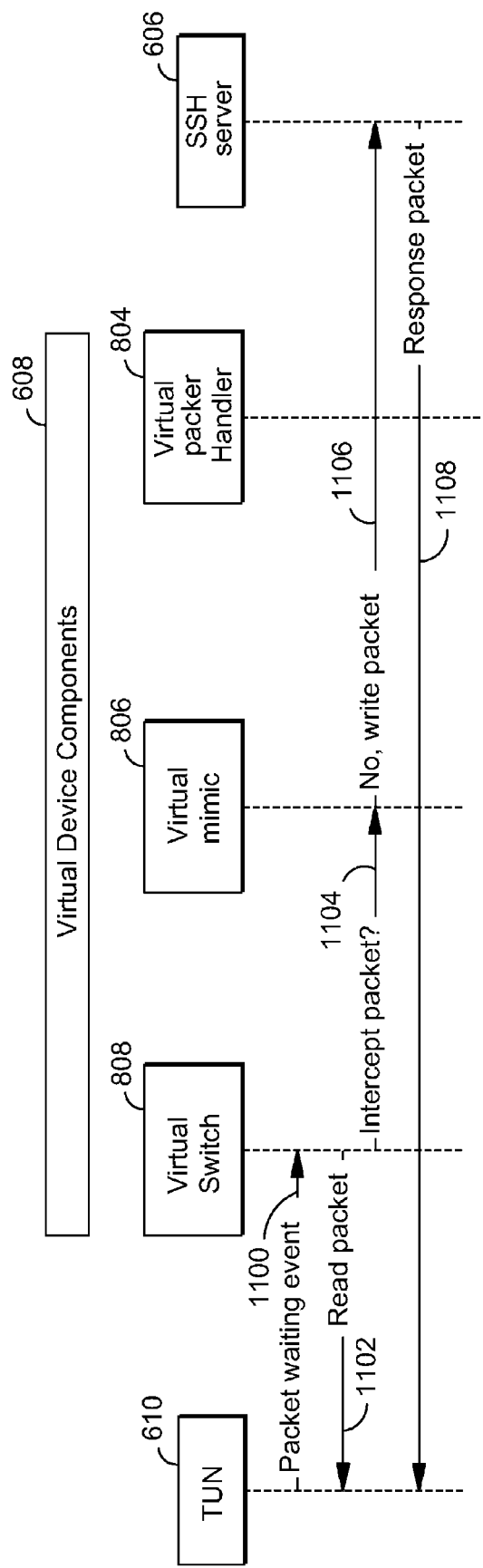
FIG. 11 is a sequence diagram illustrating a sequence for a pass-through packet according to an example embodiment.

FIG. 11 is a sequence diagram illustrating a sequence for a pass-through packet according to an example embodiment. In this regard, at sequence step 1100, entry into event loop waiting for notification from TUN (tun0 610) or SSH server 606 can occur.

Upon notification from SSH server 606, an incoming IP packet can be read from SSH server 606 at sequence step 1102. In sequence step 1104, virtual mimic 806 can determine whether the packet should be intercepted, based on whether the packet passes rules corresponding to fast rules engine processing. If the packet fails all rules, at sequence step 1106, the packet can be written to SSH server 606. In sequence step 1108, SSH server 606 can send a response packet to TUN (tun0 610). In other words, if the packet fails all rules, it can be sent normally to network device 500.

Thus, by monitoring and mapping outgoing requests and incoming responses, virtual device 608 can process outgoing IP packets to see if it can respond in place of network device 500, to improve performance or cover for when a network device (e.g., network devices 122 to 126) might be temporarily disconnected.

For example, the request may be a command to retrieve status. Virtual device 608 can realize that network device 500 has not responded recently, and virtual device 608 can respond to the request with the last known status or a status indicating that the network device is disconnected.

Upon initialization, virtual device 608 can also contact network device 500 itself to gather data, such as network device identification, type, features and other pertinent information. Virtual device 608 can then tailor itself to the specific network device or type. For example, knowing that network device 500 is a multi-function product (MFP) frequently used for uploading scanned images, virtual device 608 can check for recently scanned files and start uploading them to temporary storage in anticipation of an application request to upload the scanned files.

Figure 12:
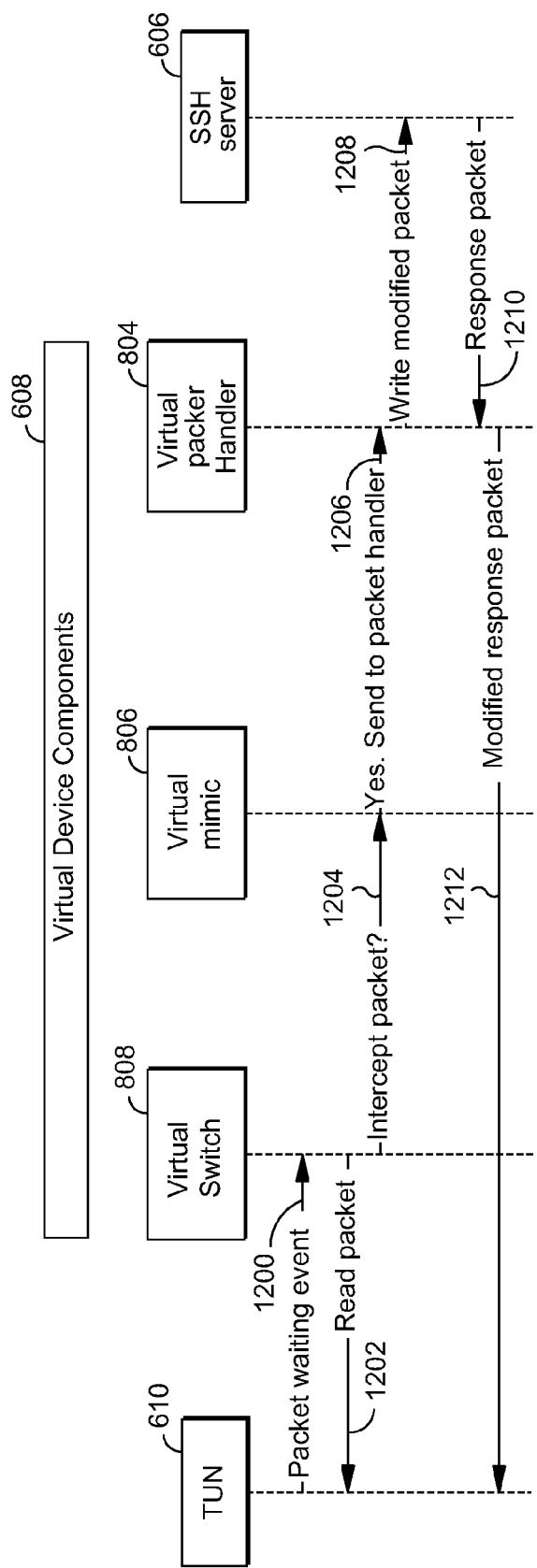
FIG. 12 is a sequence diagram illustrating another sequence for an intercepted packet according to an example embodiment.

FIG. 12 is a sequence diagram illustrating another sequence for an intercepted packet according to an example embodiment. FIG. 12 can correspond to advanced design of virtual packet handler 804, for adding functionality that network device 500 may not inherently provide support for.

In sequence step 1200, entry into the event loop and waiting for notification from TUN (tun0 610) or SSH can occur. Upon notification from TUN (tun0 610), at sequence step 1202, an outgoing IP packet can be read from TUN (tun0 610). In sequence step 1204, virtual mimic 806 can determine whether the packet should be intercepted, based on whether the packet passes rules corresponding to fast rules engine processing. If the packet passes a rule, the packet can be written to virtual packet handler 804 at sequence step 1206.

As can be seen in FIG. 12, virtual packet handler 804 can have the capability to process the packet and coordinate additional functionality with network device 500. For example, virtual packet handler 804 can write response packet(s) to the application at sequence step 1212.

Alternatively, if the IP packet fails all rules, the packet can be written to SSH server 606. Upon notification from SSH server 606, at sequence step 1208, a modified packet can be written to SSH server 606. In this regard, virtual mimic 806 can intercept packets that need to be modified from network device 500, before sending those packets to the application. At sequence step 1210, SSH server 606 can provide a response packet to virtual packet handler 804. The modified response packet can then be written to TUN (tun0 610) at sequence step 1212.

As such, FIG. 12 illustrates that an IP packet can be intercepted and processed by virtual device 608. The processing can include virtual device 608 communicating with network device 500 to execute some advanced functionality. An example can be a request to print a PDF document, where network device 500 may not support PDF document printing. In this example, virtual device 608 can intercept the request, convert the PDF document into something that network device 500 can handle, and send it to network device 500 for processing. In this regard, virtual mimic 806 can monitor responses from network device 500 and intercept or adjust them accordingly for the application.

With the foregoing arrangement, virtual device plug-ins can be used to add functionality to network device 500. For example, a plug-in can mimic functionality that a device does not support (e.g., SNMP). An application can send an SNMP packet to port 161. A fast rule under virtual mimic 806 can intercept all packets to port 161 and pass them up the chain to the virtual plug-in that handles SNMP. The virtual plug-in can then interpret the SNMP request and respond directly or communicate to network device 500 behind the scenes to fulfill the request, possibly using some network device-supported means.

Figure 13:
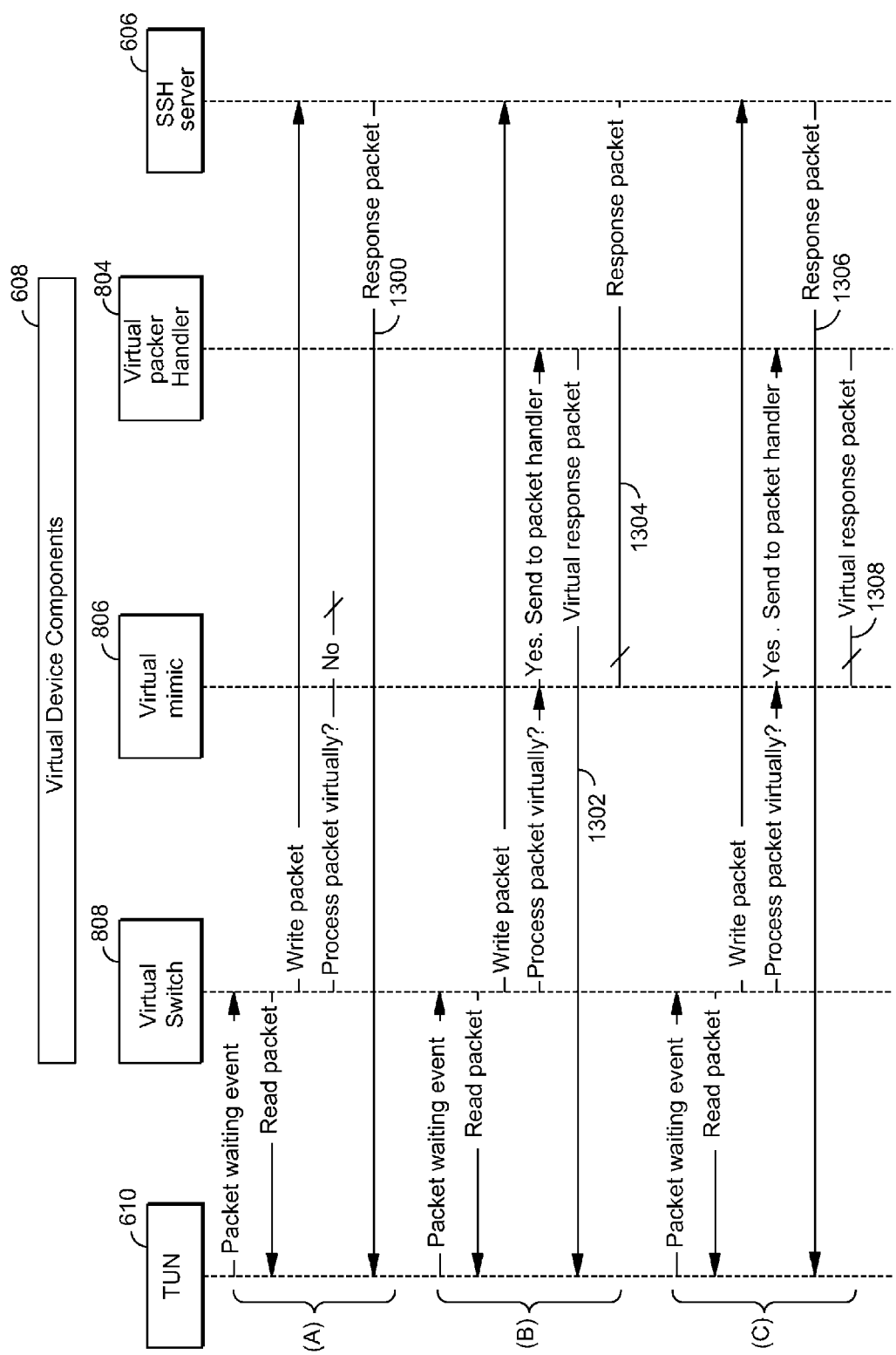
FIG. 13 is a sequence diagram illustrating other sequences for a pass-through packet according to an example embodiment.

FIG. 13 is a sequence diagram illustrating other sequences for a pass-through packet according to an example embodiment. Scenarios (A) to (C) in FIG. 13 illustrate possible packet handling scenarios where the original packet is always forwarded to the network device, before virtual mimic 806 processes a copy of the packet.

In this way, performance can be improved, since network device 500 has a chance to respond before virtual device 608. When possible, virtual device 608 can respond before network device 500, thus increasing response performance to the application.

In scenario (A), a case where virtual device 608 cannot handle the packet is illustrated. In this case, network device 500 can provide the response packet. This is illustrated in sequence step 1300, where SSH server 606 provides the response packet to TUN (tun0 610).

Scenario (B) illustrates a case where virtual device 608 can handle the packet, and responds before network device 500. This is illustrated by sequence step 1302, where virtual packet handler 804 provides a virtual response packet to TUN (tun0 610), before SSH server 606 sends a response packet in sequence step 1304.

In scenario (C), a case where virtual device 608 can handle the packet, but network device 500 responds first, is illustrated. This is illustrated by sequence step 1306, where SSH server sends a response packet to TUN (tun0 610), before virtual packet handler 804 sends a response packet in sequence step 1308.

FIG. 14 is a block diagram illustrating components for a virtual packet handler which can handle packets for a virtual device according to an example embodiment. As can be seen in FIG. 14, the virtual packet handler 1400 can include plug-ins 1402, a plug-in manager 1404, an advanced rules engine 1406 and an API 1408.

API 1408 can manage rules and plug-ins. In addition, API can allow for external management of the rules, plug-ins, and various components of virtual device 608. Configuration and meta-data can be stored in a database for persistence and management.

FIG. 15 is a sequence diagram illustrating a sequence for a combined virtual device (VD)-TUN according to an example embodiment. If there is some control over the server kernel, a custom VD-TUN (VD-TUN 1500) can be created to include the virtual device components. VD-TUN 1500 can be separate from the built in kernel TUN, and can reduce the need for virtual device 608 to monitor events, and to read and write to and from the TUN.

As can be seen in FIG. 15, a connection can be opened at sequence 1502. Registration for events can occur at sequence step 1504, followed by packet waiting at sequence step 1506. A packet can be read from VD-TUN 1500 at sequence step 1508, and SSH Server 606 can send a write packet to VD-TUN 1500 at sequence step 1510. The connection can be closed at sequence step 1512.

FIG. 16 is a flow diagram which illustrates virtually extending the functionality of a network device to a server according to an example embodiment. Following start bubble 1600, a virtual device which is in communication with the network device and which virtually represents functionality of the network device receives a function request from the server (block 1602). The function request corresponds to a function for the network device to perform. A manner to perform the function for the network device based on the function request is determined (block 1604). The function corresponding to the function request is performed based on the determined manner (block 1606). The process then ends (end bubble 1608).

In view of FIGS. 1 to 16, the use of a virtual device model can be helpful in extending functionality of a network device in a server. The virtual device may or may not be a simple pass-through to an actual network device.

To increase network efficiency, cacheable information such as device configuration and status may be retained so that the virtual device can respond directly to requests on behalf of the network device. This can provide for an environment in which the real device status and configuration is accessible by server-side applications via the cache. Furthermore, data and commands meant for consumption by a real device can be cached by the server until the network device becomes available.

The virtual device can also expose network interfaces that are not actually on the network device. For example, if the network device only supports control through a proprietary protocol, but a new standard emerges for device control, the virtual device can expose the new standard, internally translate requests to the proprietary protocol, and send the request to the real device.

In addition, network devices can be made to appear online when they are actually disconnected from the network. In this regard, data sent to the virtual device can be cached at the server and when the device returns online, synchronized. For example, a camera's pictures may be uploaded to its virtual counterpart, and an application can retrieve the pictures even if the actual camera is turned off. Alternatively, a networked camera's settings can be adjusted by an application via the virtual device, so that the network camera can pick up these new settings the next time it is turned on.

FIGS. 1 to 16 illustrate an example configuration of a network environment, which can be created to incorporate use of a virtual device. However, other configurations for a virtual network environment can be used, based on what network devices are being accessed and what functionality of the network devices is required. FIGS. 17 to 21 illustrate example embodiments corresponding to other configurations for network environments which incorporate a virtual device.

In this regard, the advent of cloud computing has encouraged IT infrastructure to be pushed to servers in data centers managed by external entities. Thus, besides the outsourcing of physical servers, the applications that typically ran within a company's walls have also been pushed out to the cloud. By further applying multi-tenancy to applications, Software as a Service (Saas) can be achieved. In this regard, Managed Device Services can be considered a candidate for a SaaS. However, in the cloud environment, the server running the management software is typically separated from the devices by firewalls. Thus, as mentioned above, it may be beneficial to create a system that virtually recreates the nodes found on a local network, so that traditional software can more easily be moved to the cloud.

Another scenario involves unifying devices communicating over otherwise disconnected networks, in order to create a more seamless user experience. For example, an environment, which includes a smart phone that communicates with the Internet through the 3G network and further includes a projector that communicates with the Internet through a Wi Fi network, can be considered. Both the smart phone and projector may be able to access the same resources on the Internet, but they are typically not able to access each other's resources directly, outside of file transfer via Bluetooth or Infrared. Thus, it may be beneficial to create a system that virtually recreates the nodes found on disparate networks, for easier bridging of network devices.

It should be noted that the devices can be participants in a system which can include, for example, a central server which establishes a mutual trust with a network device. The central server can remotely monitor and control connected devices, and the network device can send data to and receive data from the central server.

With reference to FIGS. 17 to 21, the central server can have means of creating a virtual device as described above. The virtual device can correspond to an object that virtualizes various aspects of a network device, such as network interfaces.

As also described above, the virtualized network interface of the virtual device can take the form of a TUN (e.g., a virtual network device driver) that is directly or indirectly connected to the network device using a tunneling mechanism such as SSH. An application residing on the central server (or that has remote access to the network devices) can access the TUN's IP address instead of determining how to breach a firewall and communicate with the actual network device. As an alternative to SSH-TUN, a virtual private network (VPN) can be set up between the server in the cloud and the network device in the enterprise, as will be described later.

In the examples of FIGS. 17 to 21, the server can store associations between network devices and users/groups in a database. In this regard, the virtual devices for a given user/group can be grouped into a Virtual Device Environment (VDE). In the following examples, three modes of assigning IP addresses to the TUNs in the VDE will be described.

Figure 17:
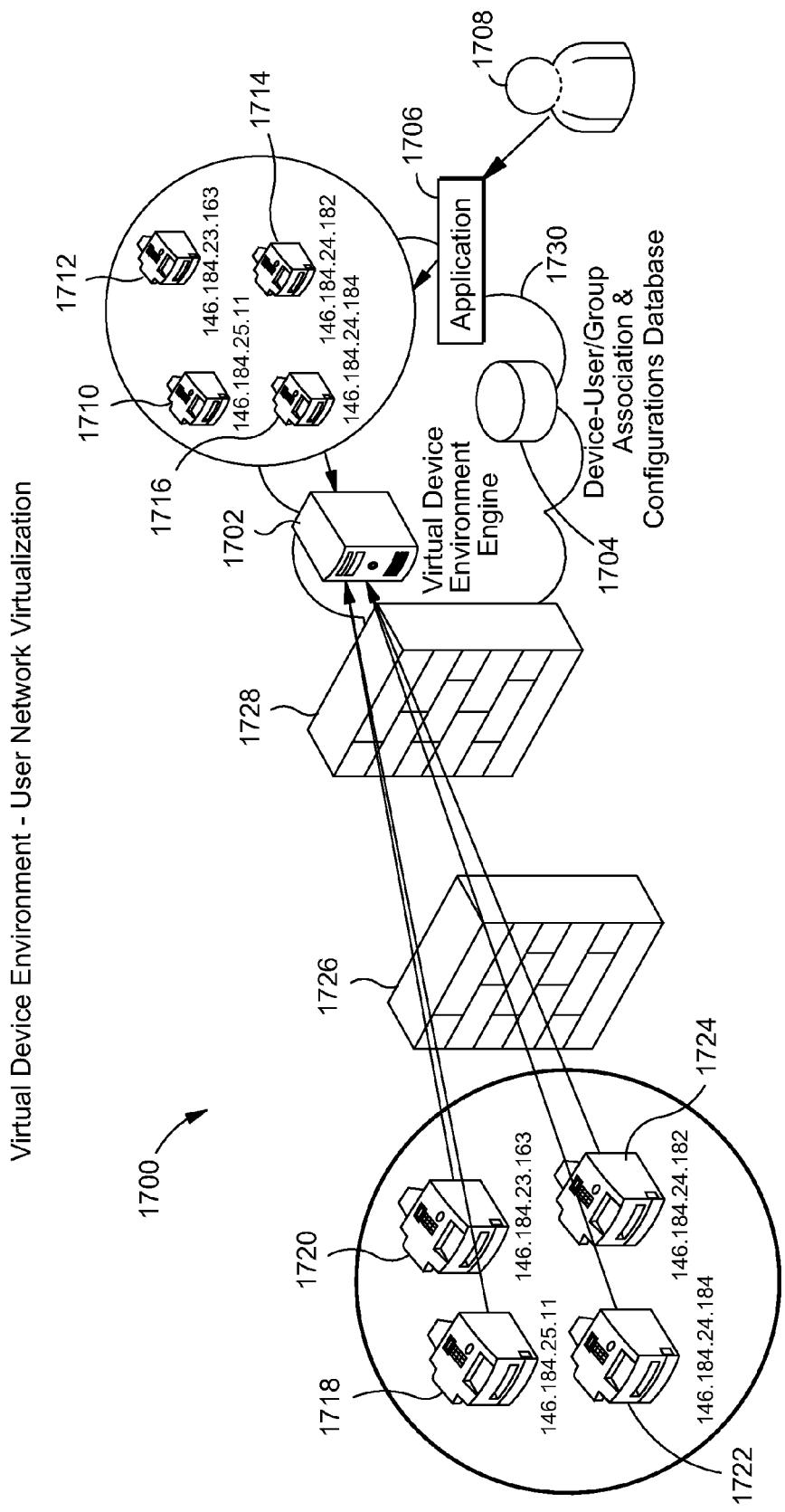
FIG. 17 is a depiction of a network environment according to another example embodiment.

A first mode of assigning IP addresses will be described with reference to FIG. 17. This mode can correspond to recreating network addresses of a user's local network. As can be seen in this diagram, VDE 1700 can include a cloud 1730, a server 1702 (which corresponds to a central server), a database 1704, an application 1706 accessible by a user device 1708, virtual devices 1710, 1712, 1714 and 1716, firewalls 1726 and 1728, and network devices 1718, 1720, 1722, and 1724.

VDE 1700 is an example where server 1702 can have information on the user/group's local network environment, based on associations and configurations that can be stored in database 1704. In this arrangement, TUNs associated with the user can be assigned the IP address that the corresponding actual network device (e.g., network devices 1718 to 1724) is assigned. As can be seen in FIG. 17, the IP addresses for virtual devices 1710 to 1716 respectively match with those of network devices 1718 to 1724. In addition, IP subnet and VLAN techniques can be used to isolate the VDE subnet from other VDE subnets.

Figure 18:
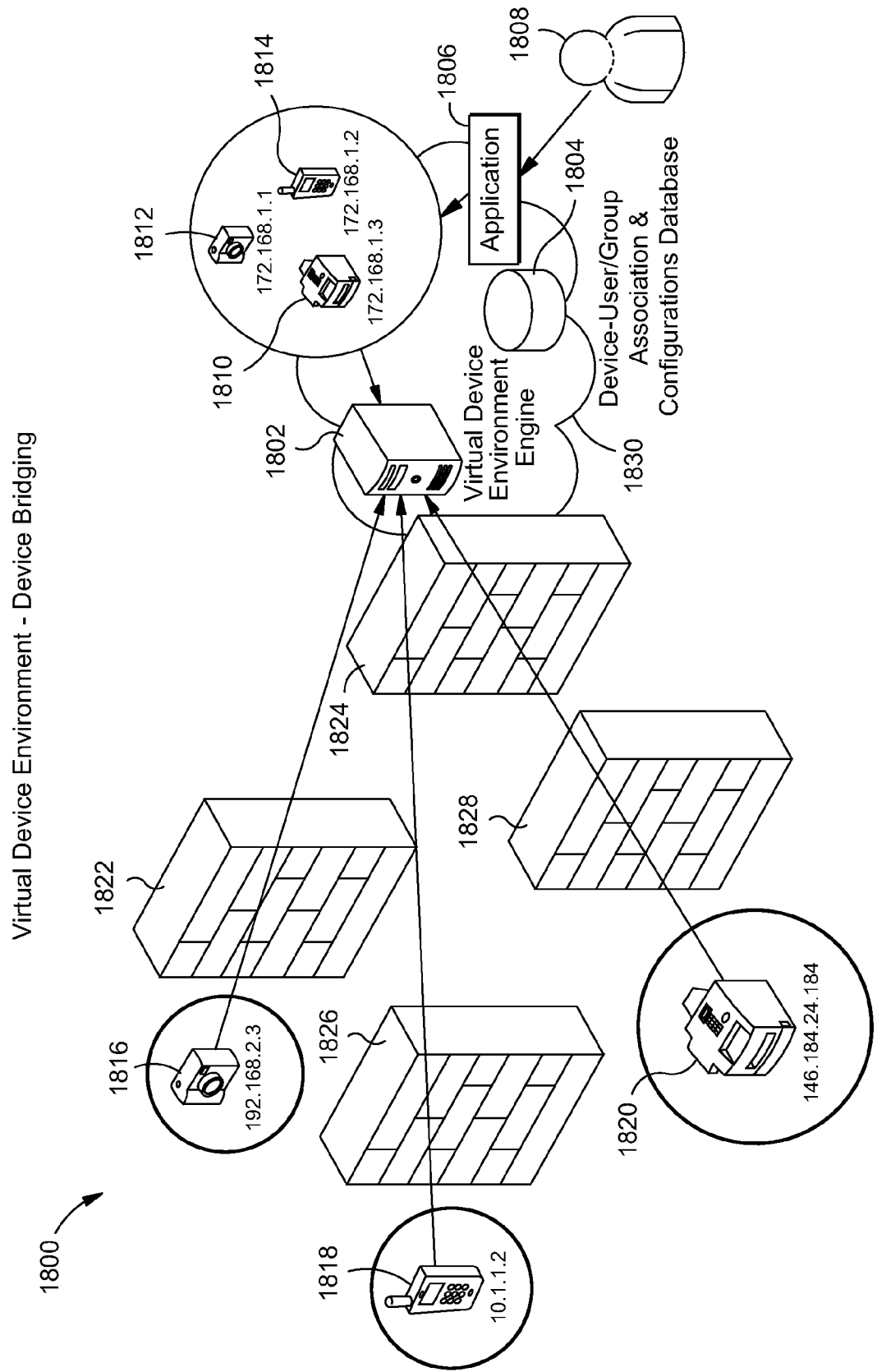
FIG. 18 is a depiction of a network environment according to yet another example embodiment.

A second mode of assigning IP addresses will be described with reference to FIG. 18, which is a depiction of a network environment according to another example embodiment. This second mode can correspond to bridging multiple user devices that are located on disparate networks. As can be seen in this diagram, VDE 1800 can include a cloud 1830, a server 1802, a database 1804, an application 1806 accessible by a user device 1808, virtual devices 1810, 1812 and 1814, firewalls 1822, 1824, 1826 and 1828, and network devices 1816, 1818 and 1820.

VDE 1800 is an example of bridging disparate networks where there is no common IP subnet, based on associations and configurations that can be stored in database 1804. In this arrangement, the TUNs can be assigned an arbitrary local subnet address. As can be seen in FIG. 18, the IP addresses for virtual devices 1810 to 1814 do not match with those of network devices 1816 to 1820.

For example, smart phone 1818 and camera 1816 may be able to access the same resources on the Internet, but may not able to access each other's resources directly, outside of file transfer via Bluetooth or Infrared. To address this, VDE 1800 can virtually recreate the nodes found on disparate networks, so that network devices such as smart phone 1818 and camera 1816 can be more easily bridged.

Figure 19:
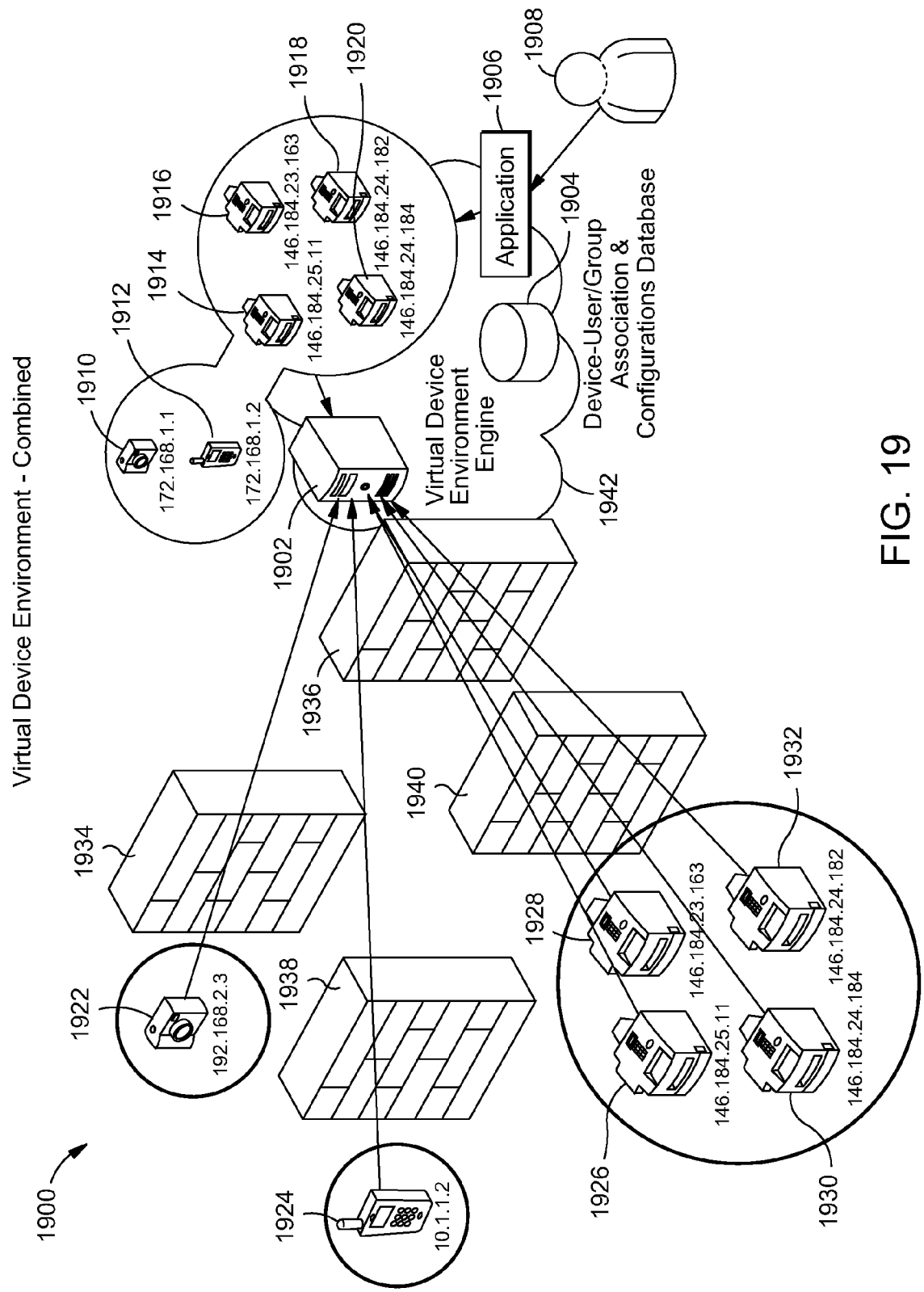
FIG. 19 is a depiction of a network environment according to yet another example embodiment.

A third mode of assigning IP addresses will be described with reference to FIG. 19, which is a depiction of a network environment according to another example embodiment. This mode can correspond to a combination of the above-described first and second modes. As can be seen in this diagram, a VDE 1900 can include a cloud 1942, a server 1902, a database 1904, an application 1906 accessible by a user device 1908, virtual devices 1910, 1912, 1914, 1916, 1918 and 1920, firewalls 1934, 1936, 1938 and 1940, and network devices 1922, 1924, 1926, 1928, 1930 and 1932.

VDE 1900 is an example of a combination of the first and second modes for assigning IP addresses. In particular, server 1902 can have information on the user/group's local network environment for certain network devices, and bridging disparate networks can be performed for other network devices where there is no common IP subnet, based on associations and configurations that can be stored in database 1904. In this arrangement, the plurality of IP subnets can be configured so that they are reachable through a gateway.

As can be seen in FIG. 1900, the IP addresses for virtual devices 1914 to 1920 respectively match with those of network devices 1926 to 1932. On the other hand, the IP addresses for virtual devices 1910 and 1912 do not match with those of network devices 1922 and 1924.

Hence, the foregoing first to third modes for assigning an IP addresses for the virtual devices allow for creation and maintenance of a virtual environment for devices within a central server that can recreate the network addresses of a user's local network and/or bridge multiple user devices located on disparate networks.

An application can send out a discovery broadcast, for example, to which the TUNs will be able to respond to. The application, upon discovering the devices the user has access to based on associations and configurations stored in a database, can directly address requests to specific virtual devices thereafter.

As described above, the virtual device may or may not be a simple pass-through to an actual network device. To increase network efficiency, cacheable information such as device configuration and status may be retained so that the virtual device can respond directly to requests on behalf of the network device.

The virtual device can also expose network interfaces that are not actually on the network device. For example, if the network device only supports control through a proprietary protocol, but a new standard emerges for device control, the virtual device can expose the new standard, internally translate requests to the proprietary protocol, and send the request to the real device.

In addition, network devices can be made to appear online when they are actually disconnected from the network. In this regard, data sent to the virtual device can be cached at the server and when the device returns online, synchronized.

Figure 20:
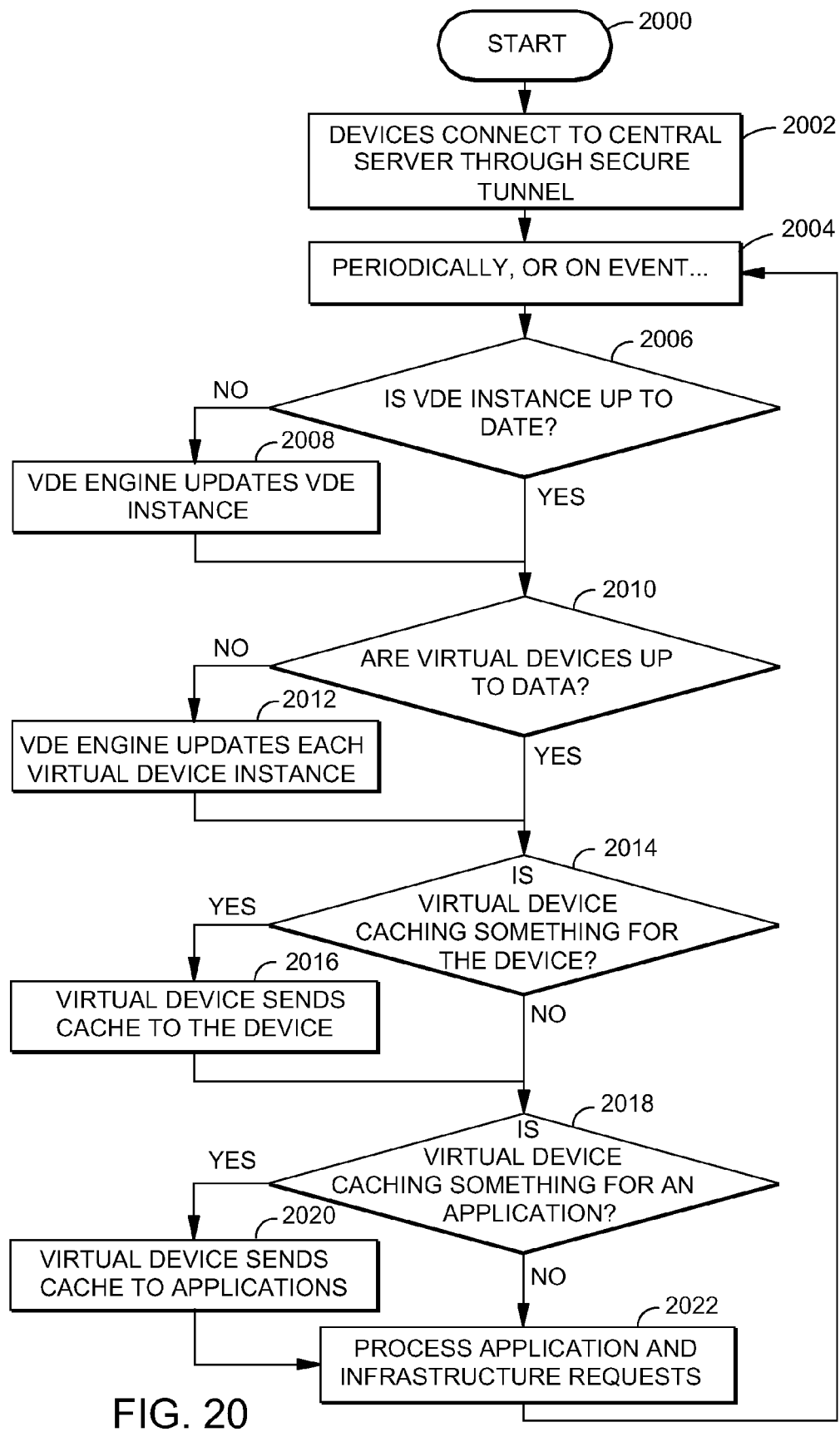
FIG. 20 is a flow diagram which illustrates the caching of network device information by a virtual device according to an example embodiment.

FIG. 20 is a flow diagram which illustrates the caching of network device information by a virtual device according to an example embodiment. At start bubble 2000, it can be presumed that network devices have been registered with the server and that user/group associations have been made. The network devices can be connected to the server through a secure tunneling mechanism (block 2002). At block 2004, period or event-based waiting can occur.

A determination can be made as to whether a VDE instance is up to date (decision diamond 2006). If the answer to this inquiry is no, the VDE engine can update the VDE instance (block 2008). More particularly, the VDE engine can check the device user/group association database and determine an appropriate addressing mode. In addition, an arbitrary IP subnet can be generated if necessary. A VDE instance can also be created if one does not already exist.

A determination can then be made as to whether the virtual devices are up to date (decision diamond 2010). If the answer to this inquiry is no, the VDE engine can update each virtual device instance (block 2012). More particularly, the VDE engine can update the TUN addresses as necessary (e.g., if the IP subnet was changed as described above). The virtual device can also be updated to reflect the latest status and configuration of the actual network device. In addition, the VDE engine can update cloud-based attributes and functionality, if changed.

A determination can then be made as to whether the virtual device is caching information for the network device (decision diamond 2014). If the answer to this inquiry is yes, the virtual device can send the cache information to the network device (block 2016). A determination can then be made as to whether the virtual device is caching information for an application (decision diamond 2018). If the answer to this inquiry is yes, the virtual device can send the cache information to the application (block 2020). The application and infrastructure requests can then be processed (block 2022), and flow can continually loop back to block 2004.

Figure 21:
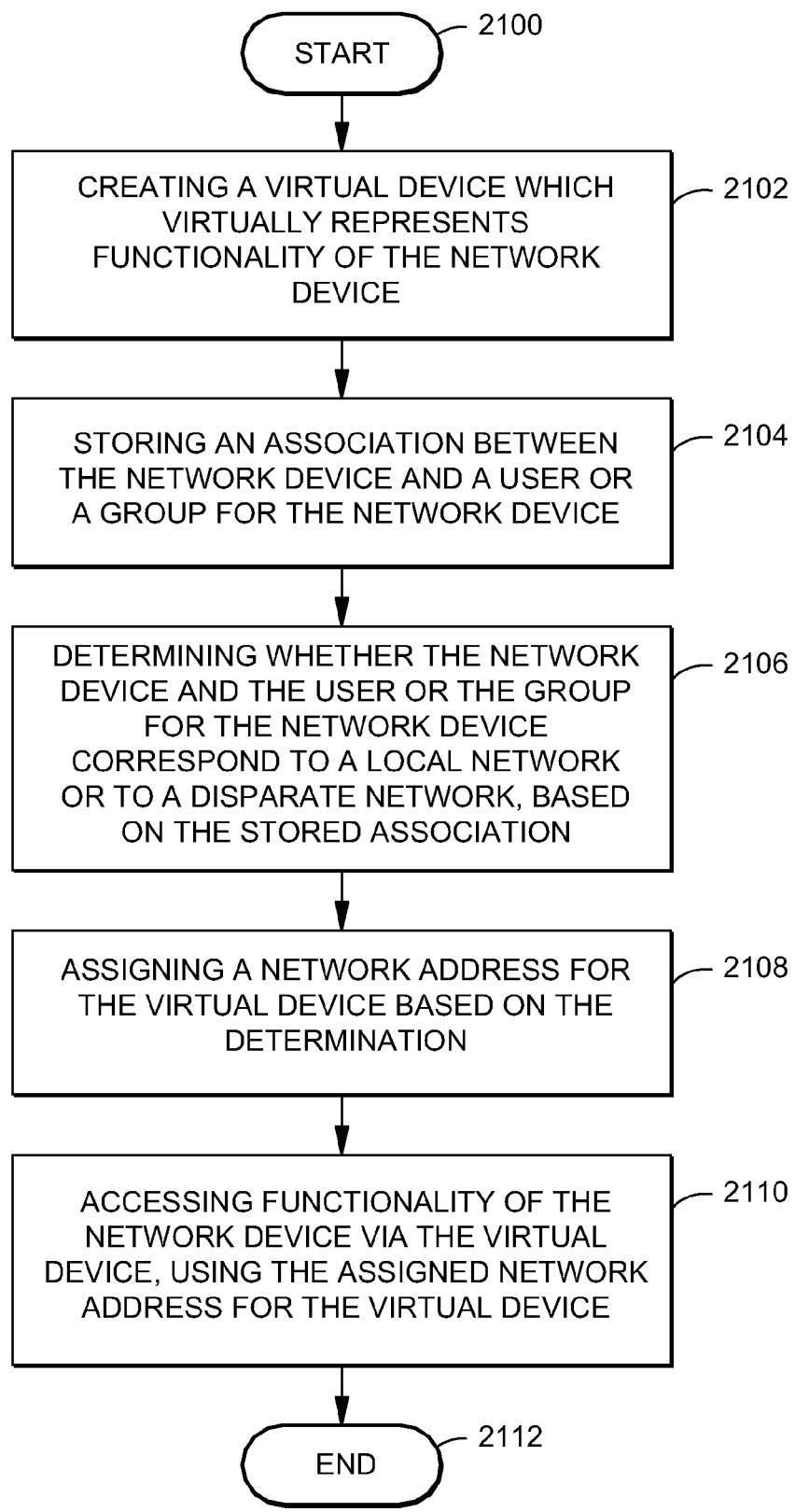
FIG. 21 is a flow diagram which illustrates virtually extending the functionality of a network device to a server, by assigning a network address to a virtual device, according to an example embodiment.

FIG. 21 is a flow diagram which illustrates virtually extending the functionality of a network device to a server, by assigning a network address to a virtual device, according to an example embodiment. Following start bubble 2100, a virtual device which virtually represents functionality of the network device is created (block 2102). An association is stored between the network device and a user or a group for the network device (block 2104). A determination is made whether the network device and the user or the group for the network device correspond to a local network or to a disparate network, based on the stored association (block 2106). A network address for the virtual device is assigned based on the determination (block 2108). Functionality of the network device is accessed via the virtual device, using the assigned network address for the virtual device (block 2110). The process then ends (end bubble 2112).

Example configurations will now be described with reference to FIGS. 1 to 21. As noted above, FIGS. 1 to 21 correspond to using a virtual device within an SSH-TUN network system. Tables 1 and 2, together with their corresponding descriptions, are example configurations and settings for such an SSH-TUN network system. Of course, it should be noted that other configurations and settings can be used.

Table 1 illustrates example software products which can be used for implementation of a server for use in a virtual network environment, as follows:

TABLE 1

| Server | |
|---|---|
| Component/description | Example Software Product |
| Cloud server | Ubuntu Linux Environment |
| SSH Server | OpenSSH server |
| TUN/TAP device driver | Universal TUN/TAP device driver added to the Linux kernel for TUN support |

Table 2 illustrates example software products which can be used for implementation of network device for use in a virtual network environment, as follows:

TABLE 2

| Network Device | |
|---|---|
| Component/Description | Example Software Product |
| Enterprise peripheral in general | Ubuntu Linux environment |
| SSH Client | OpenSSH server |
| TUN/TAP Device Driver | Universal TUN/TAP device driver added to the Linux kernel for TUN |

TABLE 2-continued

Network Device

| Component/Description | Example Software Product |
|---|---|
| | support |

With reference to FIGS. 1 to 21, an example configuration of a SSH-TUN System will now be described. More particularly, this example configuration will describe how a cloud-side server and enterprise-side network device can be set up to create a virtual network using SSH and TUN. This configuration can allow an application on the server-side to discover the network device and communicate with it using IP protocols such as TCP and UDP.

For this configuration, two IPv4 addresses can be selected from a private network range that is unused. In this example, 10.254.254.1 can be selected for the server and 10.254.254.2 for the network device.

Configuration of the SSH server for the server will now be described. In this regard, Linux servers may come with SSH installed. The actual process of setting SSH up for a virtual network will not be described in great detail, since there are general techniques for setting up an SSH. Rather, only some of the areas and settings for the particular setup, which can incorporate the virtual device model, will be described.

The security configuration of the SSH server and client is preferably configured to use Public Key Authentication and disable username-password ability. Setup of the server and network device are abbreviated as details are readily available.

Next, configuration of the TUN Interface for the server will be described. First, a TUN device is installed into the Linux kernel. The TUN device node is then created, followed by creation of the TUN interface. Again, setup of the TUN is abbreviated as details are readily available.

It should be noted that incoming SSH connections can be restricted to a specified tunnel by configuring SSH to use a specific TUN interface.

Configuration of the firewall for the server will now be described. For inbound traffic, the SSH port (e.g., port 22) should be opened to the network device.

Finally, server networking should be setup to forward IP packets by configuring the system file appropriately.

Following configuration of the server, discussion will now turn to configuration of the network device. The actual process of setting SSH up for a virtual network will not be described in great detail, since there are general techniques for setting up an SSH. The SSH Client should be configured based on the configuration of the SSH server as described above.

Next, configuration of the TUN Interface for the server will be described. First, a TUN device is installed into the Linux kernel. The TUN device node is then created, followed by creation of the TUN interface. Again, setup of the TUN is abbreviated as details are readily available.

Configuration of the firewall for the network device will now be described. For inbound traffic, connections should at least be allowed from host 10.254.254.1, or the IP address that was picked for the server's tun0.

Following configuration of the network device, discussion will now be turned to execution of the virtual network. To create the virtual network, the TUNs on both the server and the network device should be brought up so that the SSH tunnel between the network device and server can be established. Once the tunnel is established, applications from the server can access the network device through the IP address assigned to its TUN (e.g. 10.254.254.2).

As noted above, one purpose of the virtual network can be to give applications on the server side access to the network device through its firewall. It is also possible for applications on the network device to access the server using this setup, too. In this regard, access can be controlled through firewall settings on the server. In general, once the tunnel is established, applications from the network device can access the server through the IP address assigned to its TUN (e.g., 10.254.254.1).

Accordingly, use of SSH with a TUN device can be considered for on-demand, dynamic, secure, and possible short-lived connections. In addition, an SSH-TUN arrangement is typically reliable, relatively easy to setup, and can provide proven security and performance.

Tunneling TCP over TCP can be an issue for lossy networks, or networks prone to lose packets, for example, when they become highly loaded. In addition, packet delivery dynamics can be affected. An SSH-TUN arrangement can provide network support for IP traffic, such as TCP and UDP, and can support lower layer Ethernet traffic with more a slightly more complicated setup using a TAP device.

As mentioned above, FIGS. 1 to 21 and Tables 1 and 2 illustrate examples of using a virtual device within a SSH-TUN network system, and the corresponding configurations. However, other examples of networking techniques can be used to allow cloud applications direct access to network devices. One example is to setup a Virtual Private Network (VPN) between a server in the cloud and the network device (or server) in the enterprise.

Thus, in addition to the SSH-TUN network system, a VPN can provide for a network environment which uses one or more virtual devices. Using this virtual device model, a virtual device in the VPN can correspond to an application running on a server networked between an actual network device and applications that need to communicate with the network device. The virtual device can act as a middle man between the application and network device, to aid in the flow of data. In addition, the virtual device can be used for other purposes related to network device interaction. Of course, use of the virtual device is not limited to a SSH-TUN network system or a VPN, and other network systems can be configured to implement the virtual device model.

VPN typically corresponds to a software-based private network link between two or more nodes separated by an open network, such as the internet. The software can secure the network traffic over the open network. VPN can be a more complicated solution for creating a virtual network than using SSH-TUN, but can support a larger set of features.

Table 3 illustrates an example software product for implementation of a server and a network device, as follows:

TABLE 3

VPN for Server and Network Device

| Component/description | Example Software Product |
|---|---|
| VPN Software | OpenVPN |

With reference to Table 3, an example configuration of a VPN system will now be described. More particularly, this example configuration will describe how a cloud-side server and enterprise-side network device can be set up to create a virtual network using VPN. This configuration can allow an application on the server-side to discover the network device and communicate with it.

Configuration of the server in general will be described, starting with configuration of the VPN server. The actual process of setting a VPN up will not be described in great detail, since there are general techniques for setting up a VPN. Rather, only some of the areas and settings for the particular setup, which can incorporate the virtual device model, will be described. Note, the VPN software should be enabled with SSL support as well as compression software to enable real-time data compression.

First, the VPN server should be configured to use either TCP or UDP. This should be performed using the means appropriate for the software package used.

Next, configuration of the TUN Interface for the server will be described. First, a TUN device is installed into the Linux kernel. The TUN device node is then created. Again, setup of the TUN is abbreviated as details are readily available.

Configuration of the firewall for the server will now be described. For inbound traffic, the OpenVPN port (e.g., port 1194) should be opened up to the network device.

Finally, server networking should be setup to forward IP packets by configuring the system file appropriately.

Discussion will now turn from configuration of the server to configuration of the network device. Configuration of the VPN client for the network device will now be described. The actual process of setting the VPN client up will not be described in great detail, since there are general techniques readily available. The VPN Client should be configured based on the configuration of the VPN server as described above.

Next, configuration of the TUN Interface for the server will be described. First, a TUN device is installed into the Linux kernel. The TUN device node is then created. Again, setup of the TUN is abbreviated as details are readily available.

Configuration of the firewall for the network device will now be described. For inbound traffic, connections should at least be allowed from host 10.8.0.1, or whatever IP address was selected for the server's tun1.

As noted above, one purpose of the virtual network can be to give applications on the server side access to the network device through its firewall. It is also possible for applications on the network device to access the server over this setup, too. In this regard, access can be controlled through firewall settings on the server. In general, once the VPN is established, applications from the network device can access the server.

Accordingly, VPN can be used for a static, long-lived connection. A VPN arrangement can also be reliable. However, such an arrangement can be more complicated to setup than an SSH-TUN arrangement, can have more networking options, and can provide proven security and performance.

A VPN arrangement can provide network support for broader Ethernet traffic, if that is a requirement. However, it may be difficult to get a client built for network devices. For a VPN arrangement, an IP Security Protocol (IPSec) solution can be examined for robust and permanent connections. This may require more resources and more control over the end-to-end system, and this may not be possible with some customer networks.

Thus, a virtual device model can be implemented using an SSH-TUN network, a VPN, or another type of virtual network. By creating a virtual device that represents the network device to be accessed, direct access to network device functionality and events can be available, and thus, applications can more readily be developed.

As noted above, different levels of representation are possible. A server-side API can be created that abstracts away network device specifics. For example, an API for obtaining the network device status can be called by the application. How the actual status is obtained by the virtual device (e.g., a web service call, SNMP monitoring, a proprietary method, or other methods) can be hidden from the application.

In addition, device network interfaces can be replicated within the server environment. In other words, an application can initiate a service for scanning, which would normally be called by issuing a request directly to the device. This can trigger the virtual device to use port forwarding technology to invoke the scan (e.g., via a scan web service) of the network device.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for virtually extending the functionality of a network device to a server, the method comprising the steps of:
   creating a virtual device which virtually represents functionality of the network device;
   storing an association between the network device and a user or a group for the network device, wherein the association indicates one or more network devices that are associated with the user or the group;
   determining whether the network device and the user or the group for the network device correspond to a local network or to a disparate network, based on the stored association;
   assigning a network address for the virtual device based on the determination;
   accessing functionality of the network device via the virtual device, using the assigned network address for the virtual device;
   determining whether the virtual device is caching information for the network device;
   in case the virtual device is caching information for the network device, controlling the virtual device to send the cache information to the network device;
   determining whether the virtual device is caching information for an application; and
   in case the virtual device is caching information for an application, controlling the virtual device to send the cache information to the application.

2. A method according to claim 1, wherein the server and the network device are separated by a firewall.

3. A method according to claim 1, wherein the network device is remote to the server, and wherein the server accesses functionality of the network device via the virtual device in a transparent manner, such that the server does not recognize that the network device is remote.

4. A method according to claim 1, further comprising:
   replicating network interfaces for the network device on the virtual device.

5. A method according to claim 4, wherein the replicated network interfaces on the virtual device correspond to a virtual network device driver, which is directly or indirectly connected to the network device using a tunneling mechanism,
   wherein the virtual network device driver has an IP address accessible to applications residing on the server, and
   wherein the assigning step assigns the network address for the virtual device by assigning the IP address for the virtual network device driver.

6. A method according to claim 5, wherein the IP address for the virtual network device driver is assigned the IP address for the network device, in a case where the determining step determines that the network device and the user or the group for the network device correspond to a local network.

7. A method according to claim 5, wherein the IP address for the virtual network device driver is assigned an arbitrary local subnet address, in a case where the determining step determines that the network device and the user or the group for the network device correspond to a disparate network.

8. A method according to claim 1, wherein assigning a network address comprises recreating a network address of a local user's local network.

9. A method according to claim 1, wherein assigning a network address comprises bridging multiple user devices located on disparate networks.

10. A method of creating a virtual environment which virtually extends the functionality of plural network devices to a server, the method comprising the steps of:
for each of the plural network devices, virtually extending the functionality of the network device to the server with a respective virtual device, using the method of claim 1.

11. A virtual device for virtually extending the functionality of a network device to a server, comprising:
a computer-readable memory constructed to store computer-executable process steps; and
a processor constructed to execute the computer-executable process steps stored in the memory,
the process steps comprising:
storing an association between the network device and a user or a group for the network device, wherein the association indicates one or more network devices that are associated with the user or the group;
determining whether the network device and the user or the group for the network device correspond to a local network or to a disparate network, based on the stored association;
assigning a network address based on the determination;
accessing functionality of the network device using the assigned network address;
determining whether the virtual device is caching information for the network device;
in case the virtual device is caching information for the network device, controlling the virtual device to send the cache information to the network device;
determining whether the virtual device is caching information for an application; and
in case the virtual device is caching information for an application, controlling the virtual device to send the cache information to the application.

12. A virtual device according to claim 11, wherein the server and the network device are separated by a firewall.

13. A virtual device according to claim 11, wherein the network device is remote to the server, and wherein the server accesses functionality of the network device in a transparent manner, such that the server does not recognize that the network device is remote.

14. A virtual device according to claim 11, further comprising:
replicating network interfaces for the network device.

15. A virtual device according to claim 14, wherein the replicated network interfaces correspond to a virtual network device driver, which is directly or indirectly connected to the network device using a tunneling mechanism, and
wherein the virtual network device driver has an IP address accessible to applications residing on the server, and
wherein the assigning step assigns the network address by assigning the IP address for the virtual network device driver.

16. A virtual device according to claim 15, wherein the IP address for the virtual network device driver is assigned the IP address for the network device, in a case where the determining step determines that the network device and the user or the group for the network device correspond to a local network.

17. A virtual device according to claim 15, wherein the IP address for the virtual network device driver is assigned an arbitrary local subnet address, in a case where the determining step determines that the network device and the user or the group for the network device correspond to a disparate network.

18. A virtual device according to claim 11, wherein assigning a network address comprises recreating a network address of a local user's local network.

19. A virtual device according to claim 11, wherein assigning a network address comprises bridging multiple user devices located on disparate networks.

20. A non-transitory computer-readable memory medium on which is stored computer-executable process steps for virtually extending the functionality of a network device to a server, the process steps comprising:
creating a virtual device which virtually represents functionality of the network device;
storing an association between the network device and a user or a group for the network device, wherein the association indicates one or more network devices that are associated with the user or the group;
determining whether the network device and the user or the group for the network device correspond to a local network or to a disparate network, based on the stored association;
assigning a network address for the virtual device based on the determination;
accessing functionality of the network device via the virtual device, using the assigned network address for the virtual device;
determining whether the virtual device is caching information for the network device;
in case the virtual device is caching information for the network device, controlling the virtual device to send the cache information to the network device;
determining whether the virtual device is caching information for an application; and
in case the virtual device is caching information for an application, controlling the virtual device to send the cache information to the application.

21. A non-transitory computer-readable memory medium according to claim 20, wherein the server and the network device are separated by a firewall.

22. A non-transitory computer-readable memory medium according to claim 20, wherein the network device is remote to the server, and wherein the server accesses functionality of the network device via the virtual device in a transparent manner, such that the server does not recognize that the network device is remote.

23. A non-transitory computer-readable memory medium according to claim 20, further comprising:
replicating network interfaces for the network device on the virtual device.

24. A non-transitory computer-readable memory medium according to claim 23, wherein the replicated network interfaces on the virtual device correspond to a virtual network device driver, which is directly or indirectly connected to the network device using a tunneling mechanism, and
wherein the virtual network device driver has an IP address accessible to applications residing on the server, and wherein the assigning step assigns the network address for the virtual device by assigning the IP address for the virtual network device driver.

25. A non-transitory computer-readable memory medium according to claim 20, wherein assigning a network address comprises recreating a network address of a local user's local network.

26. A non-transitory computer-readable memory medium according to claim 20, wherein assigning a network address comprises bridging multiple user devices located on disparate networks.

\* \* \* \* \*